(12) United States Patent
Catalano et al.

(10) Patent No.: US 12,248,971 B2
(45) Date of Patent: Mar. 11, 2025

(54) SYSTEMS AND METHODS FOR PROVIDING REPEATED USE OF COMPUTING RESOURCES

(71) Applicant: VideoLabs, Inc., Palo Alto, CA (US)

(72) Inventors: John Catalano, Austin, TX (US); Kyle Falkenhagen, Austin, TX (US); Eric Pulier, Santa Monica, CA (US); David Roberts, Austin, TX (US); Tim Woodall, Cedar Park, TX (US)

(*) Notice: Subject to any disclaimer, the term of this patent is extended or adjusted under 35 U.S.C. 154(b) by 0 days.

(21) Appl. No.: 18/338,894

(22) Filed: Jun. 21, 2023

(65) Prior Publication Data
US 2023/0334543 A1 Oct. 19, 2023

Related U.S. Application Data

(63) Continuation of application No. 17/695,116, filed on Mar. 15, 2022, now abandoned, which is a continuation of application No. 17/094,204, filed on Nov. 10, 2020, now abandoned, which is a continuation of application No. 15/413,243, filed on Jan. 23, 2017, now abandoned, which is a continuation of application No. 14/213,540, filed on
(Continued)

(51) Int. Cl.
*G06Q 30/0601* (2023.01)
*G06F 8/36* (2018.01)

(52) U.S. Cl.
CPC .......... *G06Q 30/0603* (2013.01); *G06F 8/36* (2013.01)

(58) Field of Classification Search
CPC .............................. G06Q 30/0603; G06F 8/36
See application file for complete search history.

(56) References Cited

U.S. PATENT DOCUMENTS

| | | | |
|---|---|---|---|
| 6,012,053 A | 1/2000 | Pant et al. | |
| 6,182,226 B1 | 1/2001 | Reid et al. | |

(Continued)

FOREIGN PATENT DOCUMENTS

| | | | |
|---|---|---|---|
| KR | 20140068743 A | * | 6/2014 |
| WO | 98/58356 A2 | | 12/1998 |

(Continued)

OTHER PUBLICATIONS

Zarate et al. "Cloud Computing: A Review of PAAS, IAAS, SAAS Service and Providers" (2012)(https://www.redalyc.org/pdf/6139/613965334010.pdf) (Year: 2012).*

(Continued)

*Primary Examiner* — Sujay Koneru
(74) *Attorney, Agent, or Firm* — Workman Nydegger

(57) ABSTRACT

Systems, methods, and non-transitory computer-readable media can provide access to a first-level computing resource via a service catalog. In some instances, the first-level computing resource can be created by a first entity. Moreover, a second-level computing resource can be received. In some cases, the second-level computing resource can be created by a second entity based, at least in part, on the first-level computing resource. Access to the second-level computing resource can be provided via the service catalog. Relational information associated with the first-level computing resource and the second-level computing resource can be tracked.

20 Claims, 9 Drawing Sheets

Related U.S. Application Data

Mar. 14, 2014, now abandoned, which is a continuation-in-part of application No. 13/842,413, filed on Mar. 15, 2013, now Pat. No. 9,489,647, which is a continuation-in-part of application No. 13/354,275, filed on Jan. 19, 2012, now Pat. No. 9,069,599, which is a continuation-in-part of application No. 13/009,774, filed on Jan. 19, 2011, now Pat. No. 8,931,038, which is a continuation-in-part of application No. 12/488,424, filed on Jun. 19, 2009, now Pat. No. 8,514,868.

(60) Provisional application No. 61/434,396, filed on Jan. 19, 2011, provisional application No. 61/296,405, filed on Jan. 19, 2010, provisional application No. 61/074,027, filed on Jun. 19, 2008.

(56) References Cited

U.S. PATENT DOCUMENTS

| | | |
|---|---|---|
| 6,321,334 B1 | 11/2001 | Jerger et al. |
| 6,345,361 B1 | 2/2002 | Jerger et al. |
| 6,473,800 B1 | 10/2002 | Jerger et al. |
| 6,513,059 B1 * | 1/2003 | Gupta ............ G06F 9/4862 709/202 |
| 6,523,166 B1 | 2/2003 | Mishra et al. |
| 6,721,793 B1 * | 4/2004 | Corless ............ G06Q 10/10 709/229 |
| 6,747,598 B2 | 6/2004 | Bajikar |
| 6,847,970 B2 | 1/2005 | Keller et al. |
| 6,850,988 B1 | 2/2005 | Reed |
| 6,880,002 B2 | 4/2005 | Hirschfeld et al. |
| 6,880,089 B1 | 4/2005 | Bommareddy et al. |
| 6,996,716 B1 | 2/2006 | Hsu |
| 7,003,562 B2 | 2/2006 | Mayer |
| 7,143,439 B2 | 11/2006 | Cooper et al. |
| 7,272,646 B2 | 9/2007 | Cooper et al. |
| 7,284,267 B1 | 10/2007 | McArdle et al. |
| 7,376,965 B2 | 5/2008 | Jemes et al. |
| 7,428,754 B2 | 9/2008 | Neumann et al. |
| 7,506,357 B1 | 3/2009 | Moriconi et al. |
| 7,584,301 B1 | 9/2009 | Joshi |
| 7,613,826 B2 | 11/2009 | Guichard et al. |
| 7,620,613 B1 | 11/2009 | Moore et al. |
| 7,685,261 B1 | 3/2010 | Marinelli et al. |
| 7,697,441 B2 | 4/2010 | Bansal et al. |
| 7,698,230 B1 | 4/2010 | Brown et al. |
| 7,698,430 B2 | 4/2010 | Jackson |
| 7,730,365 B1 | 6/2010 | Belady et al. |
| 7,773,598 B2 | 8/2010 | Lindholm et al. |
| 7,774,444 B1 | 8/2010 | George et al. |
| 7,836,198 B2 | 11/2010 | Cadigan et al. |
| 7,853,687 B2 | 12/2010 | Le et al. |
| 7,886,031 B1 | 2/2011 | Taylor et al. |
| 7,937,353 B2 | 5/2011 | Bernoth et al. |
| 7,937,755 B1 | 5/2011 | Guruswamy |
| 7,996,814 B1 | 8/2011 | Qureshi et al. |
| 8,019,849 B1 | 9/2011 | Lopilato et al. |
| 8,032,933 B2 | 10/2011 | Turley et al. |
| 8,046,767 B2 | 10/2011 | Rolia et al. |
| 8,060,630 B1 | 11/2011 | Jancaitis et al. |
| 8,078,728 B1 | 12/2011 | Pollan et al. |
| 8,082,262 B2 | 12/2011 | Farber et al. |
| 8,117,289 B1 | 2/2012 | Miller et al. |
| 8,135,815 B2 | 3/2012 | Mayer |
| 8,230,050 B1 | 7/2012 | Brandwine et al. |
| 8,245,235 B1 | 8/2012 | Belady et al. |
| 8,250,581 B1 | 8/2012 | Blanding |
| 8,255,915 B1 | 8/2012 | Blanding et al. |
| 8,255,932 B1 | 8/2012 | Clemm et al. |
| 8,259,571 B1 | 9/2012 | Raphel et al. |
| 8,261,295 B1 | 9/2012 | Risbood et al. |
| 8,266,254 B2 | 9/2012 | Garrison et al. |
| 8,316,435 B1 | 11/2012 | Varadhan et al. |
| 8,369,333 B2 | 2/2013 | Hao et al. |
| 8,434,080 B2 | 4/2013 | Yendluri |
| 8,443,069 B2 | 5/2013 | Bagepalli et al. |
| 8,448,170 B2 | 5/2013 | Wipfel et al. |
| 8,468,256 B1 | 6/2013 | McArdle et al. |
| 8,473,557 B2 | 6/2013 | Ramakrishnan et al. |
| 8,510,835 B1 | 8/2013 | Bucu et al. |
| 8,533,103 B1 | 9/2013 | Certain et al. |
| 8,543,810 B1 | 9/2013 | Angal et al. |
| 8,577,761 B1 | 11/2013 | Wookey et al. |
| 8,621,552 B1 | 12/2013 | Lotem et al. |
| 8,650,299 B1 | 2/2014 | Huang et al. |
| 8,782,637 B2 | 7/2014 | Khalid |
| 8,984,610 B2 | 3/2015 | Spiers et al. |
| 9,015,324 B2 | 4/2015 | Jackson |
| 9,069,599 B2 | 6/2015 | Martinez et al. |
| 9,075,657 B2 | 7/2015 | Jackson |
| 9,684,542 B2 | 6/2017 | Franco et al. |
| 11,159,419 B1 | 10/2021 | Roersma et al. |
| 11,283,858 B2 | 3/2022 | Eder |
| 11,347,561 B1 | 5/2022 | Kumar et al. |
| 2002/0010572 A1 | 1/2002 | Orton et al. |
| 2002/0016926 A1 | 2/2002 | Nguyen et al. |
| 2002/0099823 A1 | 7/2002 | Jemes et al. |
| 2002/0129128 A1 | 9/2002 | Gold et al. |
| 2002/0178246 A1 | 11/2002 | Mayer |
| 2002/0184525 A1 | 12/2002 | Cheng |
| 2003/0051021 A1 | 3/2003 | Hirschfeld et al. |
| 2003/0051201 A1 | 3/2003 | Brenna |
| 2003/0093465 A1 | 5/2003 | Banerjee et al. |
| 2003/0105810 A1 | 6/2003 | McCrory et al. |
| 2003/0110154 A1 | 6/2003 | Ishihara et al. |
| 2003/0112182 A1 | 6/2003 | Bajikar |
| 2003/0177176 A1 | 9/2003 | Hirschfeld et al. |
| 2003/0177389 A1 | 9/2003 | Albert et al. |
| 2003/0177390 A1 | 9/2003 | Radhakrishnan |
| 2003/0182389 A1 | 9/2003 | Edwards |
| 2003/0184474 A1 | 10/2003 | Bajikar |
| 2003/0229808 A1 | 12/2003 | Heintz et al. |
| 2004/0083295 A1 | 4/2004 | Amara et al. |
| 2004/0111643 A1 | 6/2004 | Farmer |
| 2004/0210623 A1 | 10/2004 | Hydrie et al. |
| 2005/0002516 A1 | 1/2005 | Shtivelman |
| 2005/0075842 A1 | 4/2005 | Ormazabal et al. |
| 2005/0091098 A1 | 4/2005 | Brodersen et al. |
| 2005/0091353 A1 | 4/2005 | Gopisetty et al. |
| 2005/0149471 A1 | 7/2005 | Lassalle |
| 2005/0193196 A1 | 9/2005 | Huang et al. |
| 2005/0198102 A1 | 9/2005 | Hahn et al. |
| 2005/0198125 A1 | 9/2005 | Macleod et al. |
| 2005/0198299 A1 | 9/2005 | Beck et al. |
| 2005/0228878 A1 | 10/2005 | Anstey et al. |
| 2005/0257244 A1 | 11/2005 | Joly et al. |
| 2005/0283823 A1 | 12/2005 | Okajo et al. |
| 2005/0289538 A1 | 12/2005 | Black-Ziegelbein et al. |
| 2006/0004548 A1 | 1/2006 | Santos et al. |
| 2006/0005162 A1 | 1/2006 | Tseng et al. |
| 2006/0010492 A9 | 1/2006 | Heintz et al. |
| 2006/0026123 A1 | 2/2006 | Moore et al. |
| 2006/0041936 A1 | 2/2006 | Anderson et al. |
| 2006/0056297 A1 | 3/2006 | Bryson et al. |
| 2006/0059548 A1 | 3/2006 | Hildre et al. |
| 2006/0100912 A1 | 5/2006 | Kumar et al. |
| 2006/0129670 A1 | 6/2006 | Mayer |
| 2006/0129672 A1 | 6/2006 | Mayer |
| 2006/0133338 A1 | 6/2006 | Reznik et al. |
| 2006/0143495 A1 | 6/2006 | Bozak et al. |
| 2006/0143699 A1 | 6/2006 | Nagata et al. |
| 2006/0159116 A1 | 7/2006 | Gerszberg et al. |
| 2006/0212334 A1 | 9/2006 | Jackson |
| 2006/0242256 A1 | 10/2006 | Gray et al. |
| 2006/0253443 A1 | 11/2006 | Li et al. |
| 2006/0282294 A1 | 12/2006 | McComb et al. |
| 2006/0282295 A1 | 12/2006 | McComb et al. |
| 2007/0011291 A1 | 1/2007 | Mi et al. |
| 2007/0011723 A1 | 1/2007 | Chao |
| 2007/0021998 A1 | 1/2007 | Laithwaite et al. |
| 2007/0022474 A1 | 1/2007 | Rowett et al. |
| 2007/0022479 A1 | 1/2007 | Sikdar et al. |

(56) References Cited

U.S. PATENT DOCUMENTS

| | | |
|---|---|---|
| 2007/0028244 A1 | 2/2007 | Landis et al. |
| 2007/0061441 A1 | 3/2007 | Landis et al. |
| 2007/0061870 A1 | 3/2007 | Ting et al. |
| 2007/0124813 A1 | 5/2007 | Ormazabal et al. |
| 2007/0136788 A1 | 6/2007 | Monahan et al. |
| 2007/0147380 A1 | 6/2007 | Ormazabal et al. |
| 2007/0156911 A1 | 7/2007 | Menten |
| 2007/0157286 A1 | 7/2007 | Singh et al. |
| 2007/0180448 A1 | 8/2007 | Low et al. |
| 2007/0180449 A1 | 8/2007 | Croft et al. |
| 2007/0240102 A1 | 10/2007 | Bello et al. |
| 2007/0250630 A1 | 10/2007 | Blanding et al. |
| 2007/0297350 A1 | 12/2007 | Eilam et al. |
| 2008/0034365 A1 | 2/2008 | Dahlstedt |
| 2008/0046960 A1 | 2/2008 | Bade et al. |
| 2008/0059972 A1 | 3/2008 | Ding et al. |
| 2008/0072230 A1 | 3/2008 | Jackson |
| 2008/0072284 A1 | 3/2008 | Horvitz et al. |
| 2008/0082693 A1 | 4/2008 | Meijer et al. |
| 2008/0215681 A1 | 9/2008 | Darcie et al. |
| 2008/0253322 A1 | 10/2008 | So et al. |
| 2008/0306798 A1 | 12/2008 | Anke et al. |
| 2009/0036111 A1 | 2/2009 | Danford et al. |
| 2009/0063415 A1 | 3/2009 | Chatfield et al. |
| 2009/0063665 A1 | 3/2009 | Bagepalli et al. |
| 2009/0085743 A1 | 4/2009 | Ravi et al. |
| 2009/0089078 A1 | 4/2009 | Bursey |
| 2009/0126999 A1 | 5/2009 | Davidson |
| 2009/0138600 A1 | 5/2009 | Baum et al. |
| 2009/0138795 A1 | 5/2009 | Liu et al. |
| 2009/0138938 A1 | 5/2009 | Harrison et al. |
| 2009/0138958 A1 | 5/2009 | Baum et al. |
| 2009/0158302 A1 | 6/2009 | Nicodemus et al. |
| 2009/0178108 A1 | 7/2009 | Hudis et al. |
| 2009/0187927 A1 | 7/2009 | Wang et al. |
| 2009/0204795 A1 | 8/2009 | Nasuto et al. |
| 2009/0210929 A1 | 8/2009 | Zill et al. |
| 2009/0216999 A1 | 8/2009 | Gebhart et al. |
| 2009/0228950 A1 | 9/2009 | Reed et al. |
| 2009/0228967 A1 | 9/2009 | Gbadegesin et al. |
| 2009/0240346 A1 | 9/2009 | Cadigan et al. |
| 2009/0265755 A1 | 10/2009 | Hamilton et al. |
| 2009/0271324 A1 | 10/2009 | Jandhyala et al. |
| 2009/0271840 A1 | 10/2009 | Gillet et al. |
| 2009/0276771 A1 | 11/2009 | Nickolov et al. |
| 2009/0300151 A1 | 12/2009 | Friedman et al. |
| 2009/0300169 A1 | 12/2009 | Sagar et al. |
| 2009/0300210 A1 | 12/2009 | Ferris |
| 2009/0300635 A1* | 12/2009 | Ferris ............... G06F 9/5072 |
| | | 718/104 |
| 2009/0307685 A1 | 12/2009 | Axnix et al. |
| 2009/0313625 A1 | 12/2009 | Sharoff et al. |
| 2010/0010991 A1 | 1/2010 | Joshi |
| 2010/0027552 A1 | 2/2010 | Hill |
| 2010/0043067 A1 | 2/2010 | Varadhan et al. |
| 2010/0043068 A1 | 2/2010 | Varadhan et al. |
| 2010/0050239 A1 | 2/2010 | Carter et al. |
| 2010/0058435 A1 | 3/2010 | Buss et al. |
| 2010/0071024 A1 | 3/2010 | Eyada |
| 2010/0106478 A1 | 4/2010 | Barnett et al. |
| 2010/0125473 A1 | 5/2010 | Tung et al. |
| 2010/0162383 A1 | 6/2010 | Linden et al. |
| 2010/0169497 A1 | 7/2010 | Klimentiev et al. |
| 2010/0198972 A1 | 8/2010 | Umbehocker |
| 2010/0205061 A1 | 8/2010 | Karmarkar |
| 2010/0212010 A1 | 8/2010 | Stringer et al. |
| 2010/0223385 A1 | 9/2010 | Gulley et al. |
| 2010/0250497 A1 | 9/2010 | Redlich et al. |
| 2010/0275241 A1 | 10/2010 | Srinivasan |
| 2010/0287280 A1 | 11/2010 | Sivan |
| 2010/0293484 A1 | 11/2010 | Stanhope et al. |
| 2010/0293522 A1 | 11/2010 | Cifra et al. |
| 2010/0306773 A1 | 12/2010 | Lee et al. |
| 2010/0318609 A1 | 12/2010 | Lahiri et al. |
| 2010/0319004 A1 | 12/2010 | Hudson et al. |
| 2010/0332617 A1 | 12/2010 | Goodwin et al. |
| 2011/0004916 A1 | 1/2011 | Schiffman et al. |
| 2011/0016214 A1 | 1/2011 | Jackson |
| 2011/0016473 A1 | 1/2011 | Srinivasan |
| 2011/0075664 A1 | 3/2011 | Lambeth et al. |
| 2011/0083167 A1 | 4/2011 | Carpenter et al. |
| 2011/0099126 A1 | 4/2011 | Belani et al. |
| 2011/0125894 A1 | 5/2011 | Anderson et al. |
| 2011/0125895 A1 | 5/2011 | Anderson et al. |
| 2011/0126047 A1 | 5/2011 | Anderson et al. |
| 2011/0126099 A1 | 5/2011 | Anderson et al. |
| 2011/0126197 A1 | 5/2011 | Larsen et al. |
| 2011/0126207 A1 | 5/2011 | Wipfel et al. |
| 2011/0126275 A1 | 5/2011 | Anderson et al. |
| 2011/0138047 A1 | 6/2011 | Brown et al. |
| 2011/0138050 A1 | 6/2011 | Dawson et al. |
| 2011/0138441 A1 | 6/2011 | Neystadt et al. |
| 2011/0138442 A1 | 6/2011 | Vinberg et al. |
| 2011/0153727 A1 | 6/2011 | Li |
| 2011/0153824 A1 | 6/2011 | Chikando et al. |
| 2011/0154350 A1 | 6/2011 | Doyle et al. |
| 2011/0161915 A1 | 6/2011 | Srinivasamoorthy et al. |
| 2011/0166835 A1 | 7/2011 | Devarakonda et al. |
| 2011/0167034 A1 | 7/2011 | Knight et al. |
| 2011/0213869 A1 | 9/2011 | Korsunsky et al. |
| 2011/0214157 A1 | 9/2011 | Korsunsky et al. |
| 2011/0219035 A1 | 9/2011 | Korsunsky et al. |
| 2011/0219447 A1 | 9/2011 | Horovitz et al. |
| 2011/0231510 A1 | 9/2011 | Korsunsky et al. |
| 2011/0231552 A1 | 9/2011 | Carter et al. |
| 2011/0231564 A1 | 9/2011 | Korsunsky et al. |
| 2011/0231899 A1 | 9/2011 | Pulier et al. |
| 2011/0238855 A1 | 9/2011 | Korsunsky et al. |
| 2011/0258692 A1 | 10/2011 | Morrison et al. |
| 2011/0261828 A1 | 10/2011 | Smith |
| 2011/0270968 A1 | 11/2011 | Salsburg et al. |
| 2011/0277026 A1 | 11/2011 | Agarwal et al. |
| 2011/0277027 A1 | 11/2011 | Hayton et al. |
| 2011/0314466 A1 | 12/2011 | Berg et al. |
| 2011/0320606 A1 | 12/2011 | Madduri et al. |
| 2012/0005236 A1 | 1/2012 | Deng et al. |
| 2012/0005724 A1 | 1/2012 | Lee |
| 2012/0042168 A1 | 2/2012 | Yuan et al. |
| 2012/0060142 A1 | 3/2012 | Fliess et al. |
| 2012/0066487 A1 | 3/2012 | Brown et al. |
| 2012/0078643 A1 | 3/2012 | Nagpal et al. |
| 2012/0084184 A1 | 4/2012 | Raleigh et al. |
| 2012/0084189 A1 | 4/2012 | Schmitt et al. |
| 2012/0084444 A1* | 4/2012 | Sood ............... G06Q 10/10 |
| | | 709/226 |
| 2012/0110155 A1 | 5/2012 | Adlung et al. |
| 2012/0110462 A1 | 5/2012 | Eswaran et al. |
| 2012/0110588 A1 | 5/2012 | Bieswanger et al. |
| 2012/0158578 A1 | 6/2012 | Sedayao et al. |
| 2012/0163388 A1 | 6/2012 | Goel et al. |
| 2012/0173709 A1 | 7/2012 | Li et al. |
| 2012/0173728 A1 | 7/2012 | Haskins et al. |
| 2012/0179824 A1 | 7/2012 | Jackson |
| 2012/0185821 A1 | 7/2012 | Yaseen et al. |
| 2012/0185913 A1 | 7/2012 | Martinez et al. |
| 2012/0192146 A1 | 7/2012 | Arnold et al. |
| 2012/0221454 A1 | 8/2012 | Morgan |
| 2012/0222084 A1 | 8/2012 | Beaty et al. |
| 2012/0226587 A1 | 9/2012 | De Lara |
| 2012/0229499 A1 | 9/2012 | Tsao et al. |
| 2012/0239739 A1 | 9/2012 | Manglik et al. |
| 2012/0239825 A1 | 9/2012 | Xia et al. |
| 2012/0240185 A1 | 9/2012 | Kapoor et al. |
| 2012/0246740 A1 | 9/2012 | Brooker et al. |
| 2012/0281706 A1 | 11/2012 | Agarwal et al. |
| 2012/0281708 A1 | 11/2012 | Chauhan et al. |
| 2012/0290460 A1* | 11/2012 | Curry, Jr. ............ G06Q 30/08 |
| | | 705/37 |
| 2012/0324069 A1 | 12/2012 | Nori et al. |
| 2013/0013377 A1* | 1/2013 | Kruglick ............ G06Q 30/0633 |
| | | 705/348 |
| 2013/0019277 A1 | 1/2013 | Chang et al. |
| 2013/0031028 A1 | 1/2013 | Martin |
| 2013/0066940 A1 | 3/2013 | Shao |

(56) References Cited

U.S. PATENT DOCUMENTS

| | | |
|---|---|---|
| 2013/0067225 A1 | 3/2013 | Shochet et al. |
| 2013/0110967 A1 | 5/2013 | Ueoka et al. |
| 2013/0117157 A1 | 5/2013 | Iyoob et al. |
| 2013/0142201 A1 | 6/2013 | Kim et al. |
| 2013/0156189 A1 | 6/2013 | Gero et al. |
| 2013/0198740 A1* | 8/2013 | Arroyo ............... G06F 8/63 718/1 |
| 2013/0219456 A1 | 8/2013 | Sharma et al. |
| 2013/0232463 A1 | 9/2013 | Nagaraja et al. |
| 2013/0232470 A1 | 9/2013 | Yung |
| 2013/0263209 A1 | 10/2013 | Panuganty |
| 2013/0290536 A1 | 10/2013 | Dutta et al. |
| 2013/0318341 A1 | 11/2013 | Bagepalli et al. |
| 2013/0346614 A1 | 12/2013 | Baughman et al. |
| 2014/0033268 A1 | 1/2014 | Julisch et al. |
| 2014/0040975 A1 | 2/2014 | Raleigh et al. |
| 2014/0052877 A1 | 2/2014 | Mao |
| 2014/0059178 A1 | 2/2014 | Dutta et al. |
| 2014/0068743 A1* | 3/2014 | Marcus ............. H04L 63/0815 726/8 |
| 2014/0074540 A1 | 3/2014 | Evans et al. |
| 2014/0108665 A1 | 4/2014 | Arora et al. |
| 2014/0165128 A1 | 6/2014 | Auvenshine et al. |
| 2014/0215073 A1 | 7/2014 | Dow et al. |
| 2014/0230011 A1 | 8/2014 | Drewry et al. |
| 2014/0236745 A1 | 8/2014 | Vautour |
| 2014/0245423 A1 | 8/2014 | Lee |
| 2014/0279201 A1 | 9/2014 | Iyoob et al. |
| 2014/0280595 A1 | 9/2014 | Mani et al. |
| 2014/0282821 A1 | 9/2014 | Adler et al. |
| 2014/0289391 A1 | 9/2014 | Balaji et al. |
| 2015/0012864 A1 | 1/2015 | Goodwin et al. |
| 2015/0058459 A1 | 2/2015 | Amendjian et al. |
| 2015/0067677 A1 | 3/2015 | Naseh et al. |
| 2015/0067783 A1 | 3/2015 | Pulier et al. |
| 2015/0172913 A1 | 6/2015 | Decusatis et al. |
| 2015/0178699 A1 | 6/2015 | Wada et al. |
| 2015/0206207 A1 | 7/2015 | Narasimhan et al. |
| 2015/0242197 A1 | 8/2015 | Alfonso et al. |
| 2015/0261887 A1 | 9/2015 | Joukov |
| 2015/0319050 A1 | 11/2015 | Kasturi et al. |
| 2015/0372982 A1 | 12/2015 | Herle et al. |
| 2015/0381425 A1 | 12/2015 | Kansal et al. |
| 2016/0119357 A1 | 4/2016 | Kinsella et al. |
| 2016/0321572 A9 | 11/2016 | Martinez et al. |
| 2016/0381151 A1 | 12/2016 | Apte et al. |
| 2017/0126787 A1 | 5/2017 | Martinez et al. |
| 2017/0289169 A1 | 10/2017 | Plichta et al. |
| 2018/0095997 A1 | 4/2018 | Beveridge et al. |
| 2018/0234459 A1 | 8/2018 | Kung et al. |
| 2018/0267830 A1 | 9/2018 | Rivera et al. |
| 2018/0276041 A1 | 9/2018 | Bansal et al. |
| 2019/0104144 A1 | 4/2019 | Robertson et al. |
| 2019/0288956 A1 | 9/2019 | Pulier et al. |
| 2019/0306010 A1 | 10/2019 | Medam et al. |
| 2019/0306138 A1 | 10/2019 | Carru et al. |
| 2019/0306194 A1 | 10/2019 | Benson et al. |
| 2020/0404059 A1 | 12/2020 | Feiguine et al. |
| 2021/0073034 A1 | 3/2021 | Bliesner et al. |
| 2021/0111957 A1 | 4/2021 | Kovacheva et al. |
| 2022/0210195 A1 | 6/2022 | Parekh et al. |

FOREIGN PATENT DOCUMENTS

| | | |
|---|---|---|
| WO | 01/29686 A1 | 4/2001 |
| WO | 2004/012038 A2 | 2/2004 |
| WO | 2006/059343 A2 | 6/2006 |
| WO | 2009/155574 A1 | 12/2009 |
| WO | 2011/091056 A1 | 7/2011 |
| WO | 2012/069064 A1 | 5/2012 |

OTHER PUBLICATIONS

Celesti et al., An Approach to Enable Cloud Service Providers to Arrange IaaS, PaaS, and Saas Using External Virtualization Infrastructures, IEEE, 2011, 5 pages.

Decision to grant received for European Application No. 14764916, mailed on Dec. 15, 2022, 3 pages.

European Patent Application No. 09767882.5, Examination Report dated Aug. 24, 2017.

European Patent Application No. 14763216.0, Examination Report dated Nov. 2, 2017, 6 pages.

European Patent Application No. 14763216.0, Search Report dated Oct. 5, 2016, 5 pages.

European Patent Application No. EP09767882.5, Extended Search Report mailed Jul. 14, 2011.

European Patent Application No. EP09767882.5, Summons to Attend Oral Proceedings dated Feb. 1, 2019.

European Patent Application No. EP14762867.1, Extended Search Report mailed Oct. 17, 2016.

European Patent Application No. EP14764916.4, Examination Report dated Dec. 8, 2017.

European Patent Application No. EP14764916.4, Extended Search Report mailed Sep. 27, 2016.

Intention to grant received for European Application No. 14764916.4, mailed on Aug. 9, 2022, 6 pages.

International Application No. PCT/US2009/048052, International Preliminary Report on Patentability and Written Opinion mailed Dec. 21, 2010.

International Application No. PCT/US2009/048052, International Search Report and Written Opinion mailed Aug. 20, 2009.

International Application No. PCT/US2011/021741, International Search Report and Written Opinion dated May 13, 2011.

International Application No. PCT/US2011/021741, International Search Report mailed May 13, 2011.

International Application No. PCT/US2012/021921, International Search Report and Written Opinion dated Jul. 30, 2012, 7 pages.

International Application No. PCT/US2014/030461, International Search Report and Written Opinion dated Jul. 24, 2014, 9 pages.

International Application No. PCT/US2014/030536, International Search Report and Written Opinion dated Aug. 18, 2014, 9 pages.

International Application No. PCT/US2014/030599, International Search Report and Written Opinion dated Aug. 28, 2014, 10 pages.

International Preliminary Report on Patentability received for PCT Patent Application No. PCT/US11/21741, mailed on Aug. 2, 2012, 7 pages.

International Preliminary Report on Patentability received for PCT Patent Application No. PCT/US12/21921, mailed on Aug. 1, 2013, 6 pages.

International Preliminary Report on Patentability received for PCT Patent Application No. PCT/US14/30461, mailed on Sep. 24, 2015, 6 pages.

International Preliminary Report on Patentability received for PCT Patent Application No. PCT/US14/30536, mailed on Sep. 24, 2015, 6 pages.

International Preliminary Report on Patentability received for PCT Patent Application No. PCT/US14/30599, mailed on Sep. 24, 2015, 7 pages.

J. B. Yuan, Y. C. Lee and W. Wu, "Building an intelligent provisioning engine for IaaS cloud computing services", Proceedings of the 13th Asia-Pacific Network Operations and Management Symposium(APNOMS), (2011), pp. 1-6.

Mellor, Ewan et al., "Xen Management API," Version: API Revision 1.0.0, Apr. 27, 2007.

Mellor, Ewan, "The Xen-API," Xen Summit, T.J. Walson Research Center, Apr. 18, 2007.

Munyaka et al., Cloud Computing Security, 2013, 20 pages.

Office Action received for European Application No. 14764916.4, mailed on Dec. 4, 2020, 5 pages.

Office Action received for European Application No. 14764916.4, mailed on Dec. 8, 2017, 11 pages.

Office Action received for European Application No. 14764916.4, mailed on May 11, 2022, 4 pages.

PCT/US11/021741, "International Application Serial No. PCT/US11/021741, International Search Report mailed Jul. 28, 2011", Pulier, Eric et al., Jul. 28, 2011, 3 pages.

(56) References Cited

OTHER PUBLICATIONS

Qian, Ling et al., "Cloud Computing: An Overview," Proceedings of the 1st International Conference on Cloud Computing (CloudCom 2009), pp. 626-631, Dec. 1, 2009.
Singapore Patent Application No. 201009380-5, Written Opinion dated Mar. 28, 2012, 9 pages.
Supplementary European Search Report and Search Opinion received for European Application No. 14764916.4, mailed on Sep. 27, 2016, 7 pages.
Wikimedia Foundation, Inc. "Enterprise Service Bus," Wikipedia online encyclopedia entry, May 29, 2008 [retrieved online at http://en.wikipedia.org/w/index.php?lille=Enlerprise_service_bus&oldid=215734396 on Oct. 17, 2014].
Wood, Timothy et al., "Improving Data Center Resource Management, Deployment, and Availability with Virtualization", Jun. 2009, 58 pages.
Wood, Timothy et al., "The case for Enterprise-Ready Virtual Private Clouds", Jun. 19, 2009, 5 pages.

\* cited by examiner

SYSTEMS AND METHODS FOR PROVIDING REPEATED USE OF COMPUTING RESOURCES

CROSS-REFERENCE TO RELATED APPLICATIONS

This application is a Continuation of U.S. patent application Ser. No. 17/695,116, filed Mar. 15, 2022, which is a continuation of U.S. patent application Ser. No. 17/094,204, filed Nov. 10, 2010, which is a continuation of U.S. patent application Ser. No. 15/413,243, filed Jan. 23, 2017, which is a continuation of U.S. patent application Ser. No. 14/213,540, filed Mar. 14, 2014, entitled "SYSTEMS AND METHODS FOR PROVIDING REPEATED USE OF COMPUTING RESOURCES," which is a continuation-in-part of U.S. patent application Ser. No. 13/842,413, filed Mar. 15, 2013 (now U.S. Pat. No. 9,489,647, issued Nov. 8, 2016), entitled "SYSTEM AND METHOD FOR A CLOUD COMPUTING ABSTRACTION WITH SELF-SERVICE PORTAL", which is a continuation-in-part of U.S. patent application Ser. No. 13/354,275, filed Jan. 19, 2012 (now U.S. Pat. No. 9,069,599, issued Jun. 30, 2015), entitled "SYSTEM AND METHOD FOR A CLOUD COMPUTING ABSTRACTION LAYER WITH SECURITY ZONE FACILITIES", which claims priority to U.S. Provisional Patent Application No. 61/434,396 filed Jan. 19, 2011, entitled "SYSTEM AND METHOD FOR CLOUD COMPUTING", and which is a continuation-in-part of U.S. patent application Ser. No. 13/009,774 ("the '774 application") filed Jan. 19, 2011 (now U.S. Pat. No. 8,931,038, issued Jun. 1, 2015) entitled "SYSTEM AND METHOD FOR A CLOUD COMPUTING ABSTRACTION LAYER"; the '774 application claims priority to U.S. Provisional Patent App. No. 61/296,405 filed on Jan. 19, 2010, entitled "ENTERPRISE CLOUD SYSTEM AND METHOD", and is a continuation-in-part of U.S. patent application Ser. No. 12/488,424 entitled "CLOUD COMPUTING GATEWAY, CLOUD COMPUTING HYPERVISOR, AND METHODS FOR IMPLEMENTING SAME" filed Jun. 19, 2009 (now U.S. Pat. No. 8,514,868, issued Aug. 20, 2013), and published as U.S. Publication No. 20100027552 on Feb. 4, 2010, and which claims priority to U.S. Provisional Patent Application No. 61/074,027 filed Jun. 19, 2008 entitled "CLOUD COMPUTING GATEWAY AND CLOUD COMPUTING HYPERVISOR"; each of which is hereby incorporated herein by reference in its entirety.

FIELD OF THE INVENTION

The present technology relates to the field of computing resources. More particularly, the present technology relates to systems and techniques for providing repeated use of computing resources.

BACKGROUND

The use of computing resources, such as cloud computing resources, is becoming increasingly commonplace. Users of cloud computing services can utilize computing resources provided by the cloud computing services to perform a wide variety of tasks, such as providing infrastructure, platforms, or applications (e.g., software, services). In one example, entities such as corporations can utilize cloud computing to provide low-level infrastructure offerings. In another example, entities can utilize cloud computing to provide middle-level platform offerings. In a further example, entities such as application developers can utilize cloud environments to provide high-level application offerings.

In some cases, computing resources can be provided via service catalogs (or self-service portals). Service catalogs can provide users with access to computing resources (or other offerings) that are available for consumption or utilization. With respect to conventional approaches, there is usually a limited number of entities who build or create the computing resources, but a larger number of entities who consume or utilize the computing resources. As a result, under conventional approaches, the spectrum of available computing resources can be limited and the process of developing or providing these computing resources can be costly, time-consuming, and inefficient. These and other concerns can create challenges for and reduce the overall experience associated with building and utilizing computing resources.

SUMMARY

Various embodiments of the present disclosure can include systems, methods, and non-transitory computer readable media configured to provide access to a first-level computing resource via a service catalog. In some instances, the first-level computing resource can be created by a first entity. Moreover, a second-level computing resource can be received. In some cases, the second-level computing resource can be created by a second entity based, at least in part, on the first-level computing resource. Access to the second-level computing resource can be provided via the service catalog. Relational information associated with the first-level computing resource and the second-level computing resource can be tracked.

In one embodiment, the second-level computing resource can be associated with a higher-level than the first-level computing resource, and the third-level computing resource can be associated with a higher-level than the second-level computing resource.

In one embodiment, each of the first-level computing resource, the second-level computing resource, and the third-level computing resource can correspond to at least one of an Infrastructure-as-a-Service (IaaS) offering, a Platform-as-a-Service (PaaS) offering, or a Software-as-a-Service (SaaS) offering.

In one embodiment, at least two of the first entity, the second entity, or the third entity can correspond to a single entity.

In one embodiment, the relational information can includes at least one of financial information, licensing information, service-level agreement (SLA) information, or configuration information.

In one embodiment, one or more payments can be received from a fourth entity that accesses the third-level computing resource. The one or more payments can be allocated to the first entity, the second entity, and the third entity based on the relational information associated with the first-level computing resource, the second-level computing resource, and the third-level computing resource.

In one embodiment, the relational information can indicate a first portion of the one or more payments to be allocated to the first entity, a second portion of the one or more payments to be allocated to the second entity, and a third portion of the one or more payments to be allocated to the third entity.

In one embodiment, a marketplace configured to facilitate one or more interactions among users of the service catalog can be provided.

In one embodiment, a computing system can be associated with an abstraction layer of a cloud management system. The computing system can be configure to provide for repeated use of computing resources.

Many other features and embodiments of the disclosed technology will be apparent from the accompanying drawings and from the following detailed description.

Figure 1:
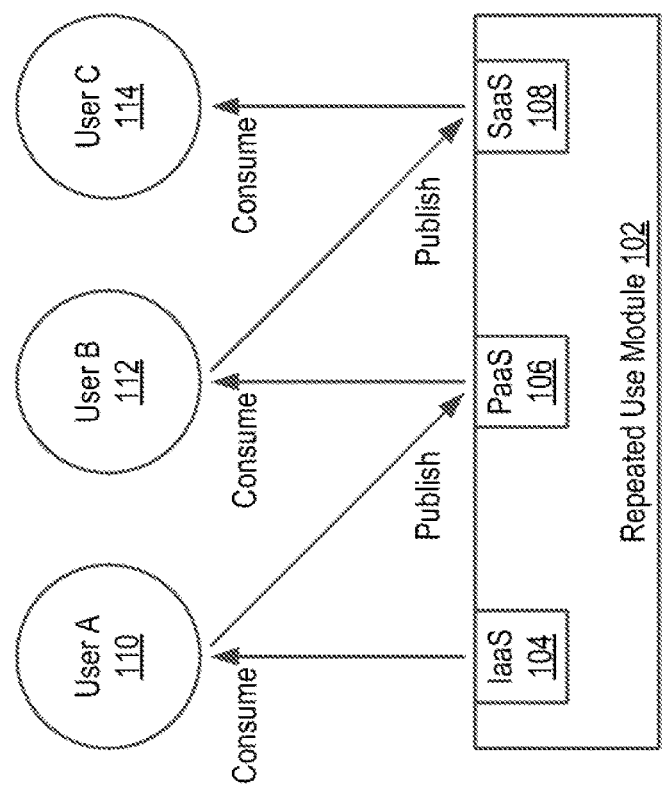
FIG. 1 illustrates an example scenario in which repeated use of computing resources can be implemented, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Providing Repeated Use of Computing Resources

It is becoming more commonplace to consume or utilize cloud computing resources. For example, users often consume cloud-based information technology (IT) resources using a self-service portal or service catalog. In some instances, the cloud-based IT resources can be categorized as Infrastructure-as-a-Service (IaaS), Platform-as-a-Service (PaaS), or Software-as-a-Service (SaaS). In general, IaaS, PaaS, and SaaS resources can differ with respect to the "completeness" of the resource. For example, IaaS is usually associated with delivery of low-level operating system instances and resources, whereas PaaS is associated with delivery of a middle-ware environment and resources, which can be suitable for deploying application code. Moreover, SaaS is usually associated with delivery of high-level, full-featured, ready-to-use applications (e.g., software, services, programs, etc.).

In some embodiments, higher-level offerings can be built (e.g., created, generated, developed, etc.) based on lower-level offerings. For instance, one can build a PaaS offering by starting with an IaaS resource and then adding and configuring middle-ware software to the IaaS resource to create the PaaS offering. Similarly, one can build a SaaS application based on a PaaS resource or offering.

Under conventional approaches, self-service portals or service catalogs can operate in a somewhat restricted fashion. With respect to conventional approaches to providing offerings (or computing resources), there can be a relatively small number of entities who create or build offerings and a relatively larger number of entities who consume or utilize offerings.

Various embodiments of the present disclosure can provide for repeated use (e.g., recursive consumption and/or publication) of computing resources or offerings, such as cloud computing resources or offerings. The disclosed technology can provide a self-service portal or service catalog configured to allow for a layered creation of offerings by a relatively larger number of users or entities. In some cases, a user can identify and consume a low-level offering (e.g., IaaS) and use it to build a middle-level offering (e.g., PaaS) by adding and configuring middle-ware software components. The middle-level offering can then be "republished" back into (or made available at) the self-service portal or service catalog for consumption by other users. Further, a middle-level offering, such as the middle-level offering built based on the low-level offering, can be consumed and used to create a high-level offering (e.g., SaaS). The high-level offering can also be republished back into the self-service portal or service catalog for subsequent consumption or utilization. Relational information associated with the low-level, middle-level, and/or high-level offerings can also be tracked, such as for payment allocation and/or licensing purposes. Accordingly, the disclosed technology can, for example, provide an improved approach to consuming and publishing computing resources (e.g., repeatedly or recursively), allow for a larger number of entities to build and offer computing resources, and permit a wider variety of computing resources to be published and available.

FIG. 1 illustrates an example scenario 100 in which repeated use of computing resources can be implemented, according to an embodiment of the present disclosure. The example scenario 100 can include a repeated use module (e.g., component, unit, system, etc.) 102. In some embodiments, the repeated use module 102 can be implemented in, integrated with, or can correspond to a service catalog, which can reside, in part or in whole, within an abstraction layer of a cloud management system/platform. The repeated use module 102 can be configured to automate and facilitate repeated use (e.g., recursive consumption and/or publication) of computing resources or offerings. For example, the repeated use module 102 can provide access to a low-level resource such as IaaS 104, a high-level resource such as SaaS 108, as well as one or more intermediate-level or middle-level resources such as PaaS 106.

In the example of FIG. 1, the repeated use module 104 can be configured to provide User A 110 with access to the low-level resource (e.g., IaaS 104). The low-level resource can provide infrastructure, an operating system (OS), and/or other low-level features. User A 110 can consume or utilize the low-level resource to build, create, or develop a middle-level resource (e.g., PaaS 106). For instance, User A 110 can add middleware and/or other middle-level functionality, such as web servers, applications servers, storage systems, databases, etc., to the low-level resource in order to create the middle-level resource. Subsequently, User A 110 can "publish" (e.g., make available, provide, offer, release, etc.) the middle-level resource via the repeated use module 102. The repeated use module 102 can then provide access to the middle-level resource for consumption.

Continuing with the example of FIG. 1, User B 112 can search for, find, and/or identify the middle-level resource (e.g., PaaS 106) via the repeated use module 102. User B 112 can consume the middle-level resource and use it to develop a high-level resource (e.g., SaaS 108). For example, User B 112 can start with the middle-level resource and deploy application code with respect to the middle-level resource to generate a high-level resource (e.g., SaaS 108), such as an application, service, program, software, etc. User B 112 can publish and offer the generated high-level resource via the repeated use module 102. For example, User B 112 can republish (or publish) the high-level resource back into the repeated use module 102 (or into a service catalog associated with the repeated use module 102). The repeated use module 102 (or associated service catalog) can enable the high-level resource to be available for consumption. User C 114 can, for example, consume the high-level resource.

Accordingly, the example scenario 100 of FIG. 1 can illustrate how the repeated use module 102 is configured to provide the ability to link publishing/republishing steps together, such as by publishing IaaS 104, (re-)publishing PaaS 106, and (re-)publishing SaaS 108.

In some instances, each of User A 110, User B 112, and User C 114 can correspond to an entity, such as a corporation, company, enterprise, organization, group, individual, virtual unit, etc., or any combination thereof, or to any number of persons associated with the entity. In one example, User A 110, User B 112, and User C 114 can all correspond to the same entity. In another example, at least two of User A 110, User B 112, and User C 114 can correspond to the same entity. In a further example, User A 110, User B 112, and User C 114 can correspond to different entities.

In some cases, the consumption of low-level resources (e.g., low-level offerings, low-level services, etc.) and the republishing of higher-level resources (e.g., resources having a higher-level than low-level resources) built on the low-level resources can occur within a single entity. For instance, the consumers, publishers, and/or users of the resources can correspond to different departments within an entity. In one example, an IT department of a company can create a PaaS offering using IaaS resources. Then application developers (e.g., business units) of the company can create a SaaS offering based on the PaaS offering created by the company's IT department.

Figure 2:
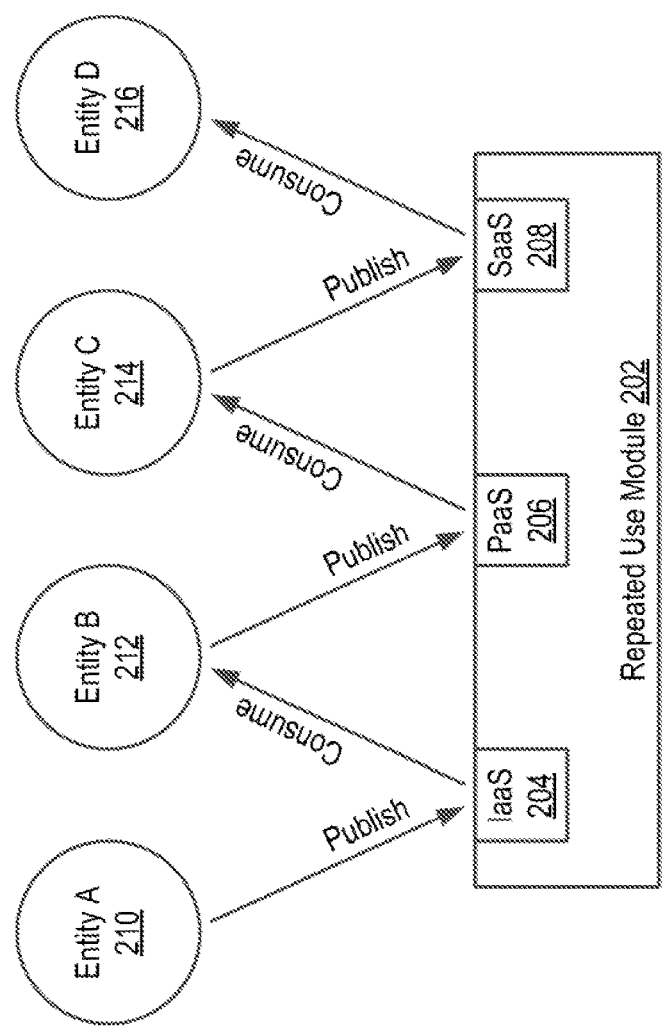
FIG. 2 illustrates an example scenario in which repeated use of computing resources can be implemented, according to an embodiment of the present disclosure.

FIG. 2 illustrates an example scenario 200 in which repeated use of computing resources can be implemented, according to an embodiment of the present disclosure. In some cases, the consumption and republishing of computing resources or offerings can, for example, occur among different entities, such as organizations, using a (global) self-service portal or service catalog. For instance, as shown in the example scenario 200 of FIG. 2, Entity A 210 can create and offer/publish an IaaS resource 204 via a repeated use module 202 (or via a service catalog associated with the repeated use module 202). Entity B 212 can (find and) consume the IaaS resource 204 and use it to create a PaaS offering 206. Entity B 212 can subsequently offer or (re-)publish the PaaS offering 206 back at the repeated use module 202 (or service catalog). Entity C 214 can (identify and) consume the PaaS offering 206 published by Entity B 212 and can use it to create a SaaS offering 208. Entity C 214 can (re-)publish the SaaS offering 208 back at the repeated use module 202 (or service catalog). Entity D 216 can then consume the SaaS offering 208 published by Entity C 214.

Figure 3:
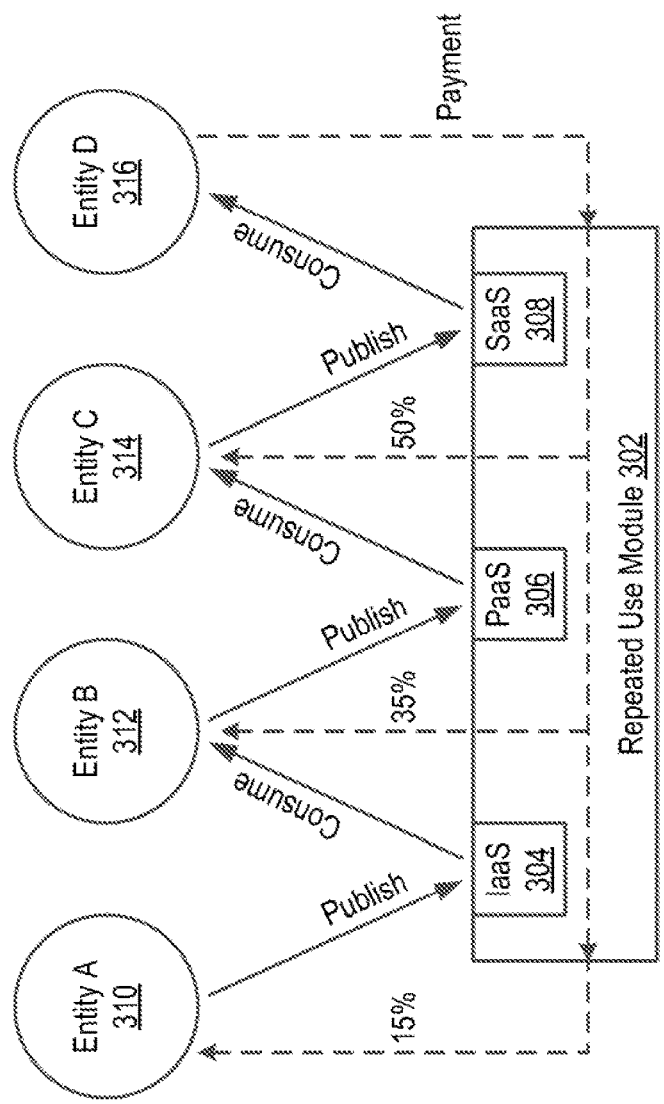
FIG. 3 illustrates an example scenario in which repeated use of computing resources can be implemented and relational information can be tracked, according to an embodiment of the present disclosure.

Furthermore, the disclosed technology can provide for the tracking, recording, and/or maintenance of relational information associated with various uses and/or users of the computing resources or offerings. FIG. 3 illustrates an example scenario 300 in which repeated use of computing resources can be implemented and relational information can be tracked, according to an embodiment of the present disclosure. In some embodiments, relational information can refer to information associated with the relationships between various computing resources or offerings provided by a repeated use module 302 (or service catalog) and/or the relations between their consumers, publishers, and/or users. In some instances, relational information can include (but is not limited to) information about money flow or finances (e.g., real money, virtual money, internal budget, etc.) associated with the various uses (e.g., consumption, publication, republication, etc.) and/or users (e.g., consumers, publishers, republishers, etc.) of the computing resources or offerings.

For instance, consumption of a low-level resource can "cost" a given amount. A publisher or developer of a middle-level resource can create the middle-level resource based on the low-level resource, and can offer the created middle-level resource for sale. The publisher or developer of the middle-level resource can consider the given cost of the low-level resource as a "cost of goods sold." The publisher or developer of the middle-level level can accordingly price the middle-level resource to cover the given cost of the low-level resource. In addition, a publisher or developer of a high-level resource can create the high-level resource based on the middle-level resource. The high-level resource publisher or developer can also consider the price paid for the middle-level resource as a "cost of goods sold." As such, the high-level resource publisher or developer can price its offered high-level resource to cover the cost of the middle-level resource (which incorporates the cost of the low-level resource). When a high-level resource consumer pays for the high-level resource, the price paid can cover the costs associated with all of the high-level, middle-level, and low-level resources. Various embodiments of the present disclosure can track (e.g., record, maintain, etc.) relational information, including financial information, associated with various uses and/or users of the computing resources and can allocate or distribute finances appropriately based on the financial information.

In FIG. 3, the illustrated example scenario 300 can involve a repeated use module 302 (and/or a service catalog associated with the repeated use module 302). Entity A 310 can create and publish an IaaS resource 304 via the repeated use module 302 (or service catalog). In this example, Entity A 310 can decide to charge $15 for the IaaS resource 304.

Continuing with the example, Entity B 312 can find the IaaS resource 304 and decide to consume or use the IaaS resource 304 to create a PaaS resource 306. Entity B 312 can decide to charge $35 for building the PaaS resource 306, which is built based on the $15 IaaS resource 304, and thus resulting in a total of $50 for the PaaS resource 306 built on the IaaS resource 304. Entity B 312 can offer and republish the PaaS resource 306 back at the repeated use module 302 (or service catalog).

Subsequently, in this example, Entity C 314 can identify the PaaS resource 306 and decide to consume or use the PaaS resource 306 to create a SaaS resource 308. Entity C 314 can decide to charge $50 for building the SaaS resource 308, which is built based on the $35 PaaS resource 306 and the $15 IaaS resource 304, and thus resulting in a total of $100 for the SaaS resource 308 (incorporating the PaaS resource 306 and the IaaS resource 304). Entity C 314 can then offer and republish the SaaS resource 308 back at the repeated use module 302 (or service catalog).

Finally, in this example, Entity D 316 can decide to purchase the SaaS resource 308 and pay $100. As discussed previously, the repeated use module 302 can track the relational information, including financial information, associated with the SaaS resource 308, the PaaS resource 306, and the IaaS resource 304 (and/or the relational information associated with Entity A 310, Entity B 312, and Entity C 314). Accordingly, the repeated use module 302 can automatically allocate (and/or distribute) the $100 paid by Entity D 316 in the appropriate amounts to Entity A 310, Entity B 312, and Entity C 314. In this example, 50% of the $100 (or $50) can be given to Entity C 314, 35% of the $100 (or $35) can be given to Entity B 312, and 15% of the $100 (or $15) can be given to Entity A 310.

Moreover, in some cases, other types of relational information can be tracked by the repeated use module 302. For example, in addition to financial information, the repeated use module 302 can be configured to track and apply other types of relational information including (but not limited to) licensing information, service-level agreement (SLA) information, configuration information, and/or other similar types of information. Further, constraints related to the relational information can be applied by the repeated use module 302.

With respect to licensing information as an example, the repeated use module 302 can receive and enforce licensing terms as constraints with respect to an IaaS resource, a PaaS resource, a SaaS resource 108, or any other level of computing resource. For example, an entity that publishes a resource may offer the resource subject to specified licensing terms to consumers of the resource. The licensing terms can limit access to the resource based on any number and any types of constraints, such as number of seats, usage restrictions, geographic restrictions, tiered pricing structures, time duration, competitive exclusions, etc. The repeated use module 302 may enforce these constraints before or during consumption of the resource by any entity. For example, if the license terms provide that a consuming entity may not exceed a predetermined number of seats, then the repeated use module 302 may determine how many users associated with the entity are using the resource and cease access for users that exceed the permitted number of seats.

As another example, the license terms on which the resource can be offered to an entity may provide for usage restrictions. In this regard, if the license terms prohibit the combination of an offered resource with certain other resources (e.g., incompatible software, open source software with copyleft, etc.), then the repeated use module 302 can prohibit such combination by a consuming entity.

As yet another example, the license terms for the resource published by an entity can exclude competitors of the entity from accessing the resource. In this case, the repeated use module 302, upon determining that a competitor to the entity seeks access to the resource, can deny the competitor access to the resource.

In a similar manner, the repeated use module 302 may apply constraints associated with SLAs and configuration information in the publication and consumption of resources.

Figure 4:
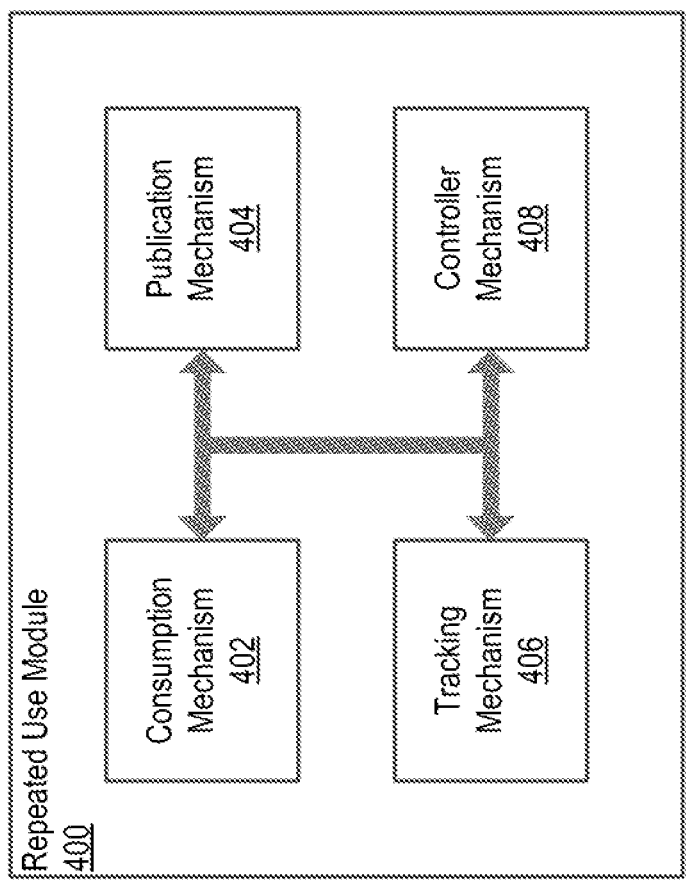
FIG. 4 illustrates an example system implementation configured to provide repeated use of computing resources, according to an embodiment of the present disclosure.

FIG. 4 illustrates an example system implementation configured to provide repeated use of computing resources, according to an embodiment of the present disclosure. In FIG. 4, the example system implementation can correspond to a repeated use module 400. The repeated use module 400 can correspond to the repeated use module 102 of FIG. 1, the repeated use module 202 of FIG. 2, the repeated use module 302 of FIG. 3, and/or the repeated use module 750 of FIG. 7. The repeated use module 400 can, for example, comprise a consumption mechanism (or component, feature, unit, module, etc.) 402, a publication mechanism 404, a tracking mechanism 406, and a controller mechanism 408. The controller mechanism 408 can be configured to manage or control the various tasks of the repeated use module 400, such as facilitating the interactions or communications among the consumption mechanism 402, the publication mechanism 404, and/or the tracking mechanism 406. The controller mechanism 408 can also apply constraints relating to relational information in the publication and consumption of resources, as discussed herein.

In some embodiments, the consumption mechanism 402 can be configured to perform operations associated with the consumption of computing resources or offerings. For example, the consumption mechanism 402 can be configured to facilitate providing access to various computing resources or offerings for consumption.

In some embodiments, the publication mechanism 404 can be configured to perform operations associated with the publishing (or republishing) of computing resources or offerings. For example, the publication mechanism 404 can be configured to facilitate receiving various developed/created computing resources or offerings to be offered and/or (re-)published.

In some embodiments, the tracking mechanism 406 can be configured to perform operations associated with tracking, recording, and/or maintaining information (e.g., relational information) associated with various computing resources and/or users. For example, the tracking mechanism 406 can be configured to facilitate tracking relational information including (but not limited to) financial information, licensing information, service-level agreement (SLA) information, and/or configuration information. In some embodiments, the tracking mechanism 406 can also be configured to facilitate receiving one or more payments and allocating (and/or distributing) the one or more payments appropriately based on the relational information.

Figure 5:
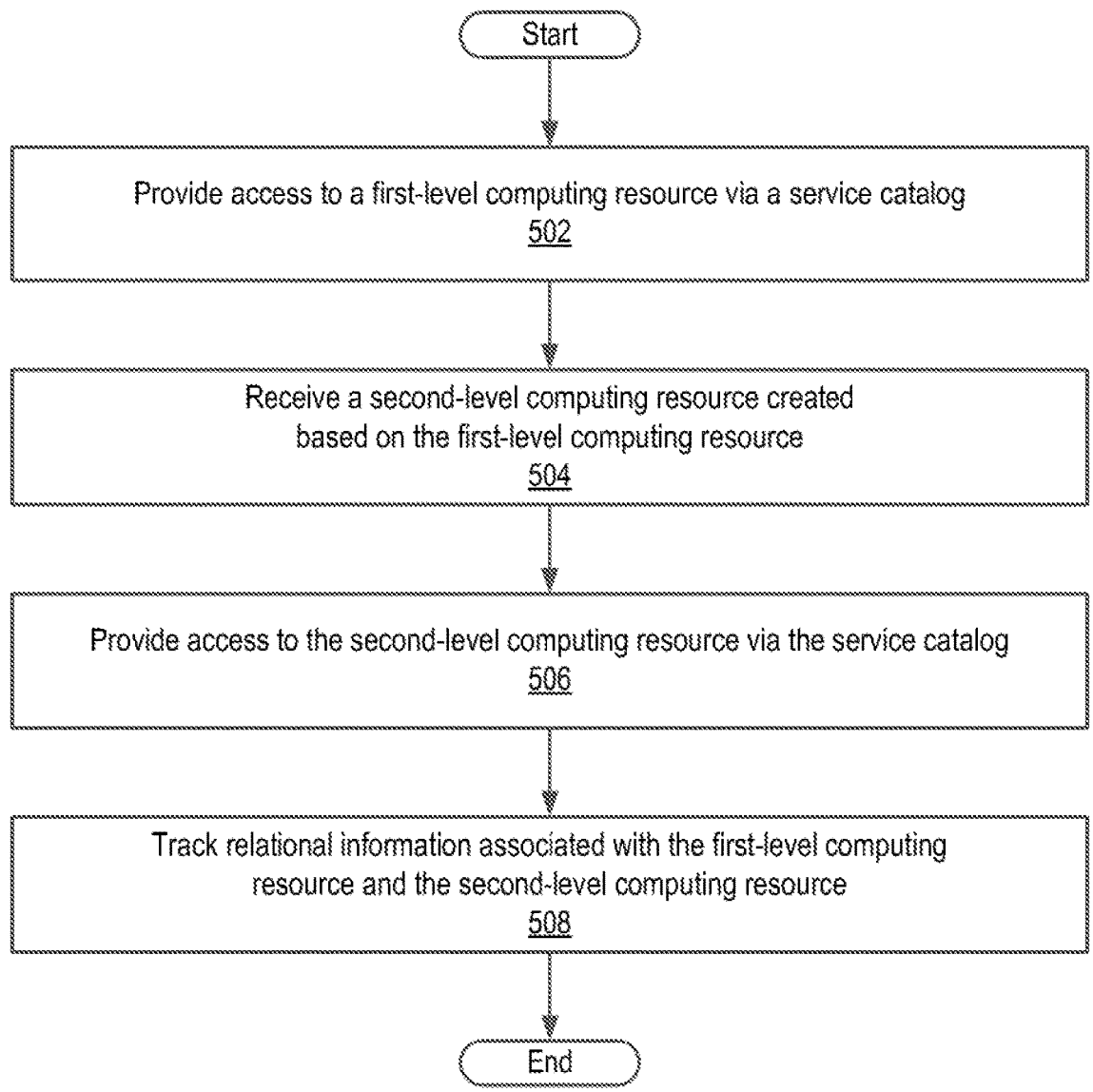
FIG. 5 illustrates an example method implementation for providing repeated use of computing resources, according to an embodiment of the present disclosure.

FIG. 5 illustrates an example method implementation 500 for providing repeated use of computing resources, according to an embodiment of the present disclosure. It should be appreciated that there can be additional, fewer, or alternative steps performed in similar or alternative orders, or in parallel, within the scope of the various embodiments unless otherwise stated. At step 502, the example method implementation 500 can provide access to a first-level computing resource via a service catalog. In some instances, the first-level computing resource can be created by a first entity.

Step 504 can include receiving a second-level computing resource. In some implementations, the second-level computing resource can be created by a second entity based, at least in part, on the first-level computing resource. Moreover, access to the second-level computing resource can be provided via the service catalog, at step 506.

Then, the example method implementation 500 can track relational information associated with the first-level computing resource and the second-level computing resource, at step 508. In some embodiments, the relational information can include (but is not limited to) at least one of financial information, licensing information, service-level agreement (SLA) information, and/or configuration information, etc., as discussed previously.

Figure 6:
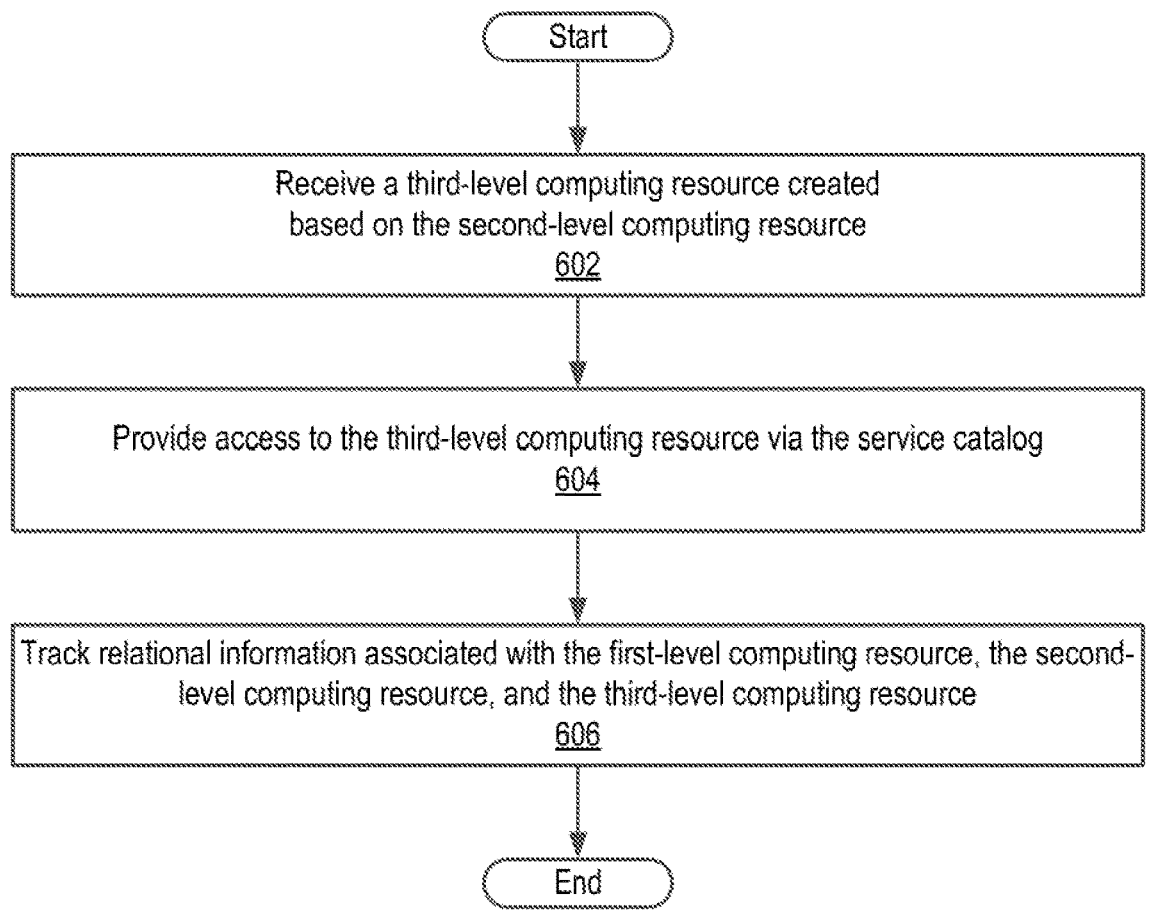
FIG. 6 illustrates an example method implementation for providing repeated use of computing resources, according to an embodiment of the present disclosure.

FIG. 6 illustrates an example method implementation 600 for providing repeated use of computing resources, according to an embodiment of the present disclosure. Again, there can be additional, fewer, or alternative steps performed in similar or alternative orders, or in parallel, within the scope of the various embodiments unless otherwise stated. The example method 600 can receive a third-level computing resource, at step 602. In some embodiments, the third-level computing resource can be created by a third entity based, at least in part, on the second-level computing resource.

The example method 600 can provide access to the third-level computing resource via the service catalog, at step 604. Step 606 can include tracking relational information associated with the first-level computing resource, the second-level computing resource, and the third-level computing resource.

Furthermore, in some embodiments, one or more payments can be received from a fourth entity that accesses the third-level computing resource. The one or more payments can be allocated (and/or distributed) to the first entity, the second entity, and the third entity based on the relational information associated with the first-level computing resource, the second-level computing resource, and the third-level computing resource.

In some cases, as discussed previously, the relational information can indicate a first portion of the one or more payments to be allocated to the first entity, a second portion of the one or more payments to be allocated to the second entity, and a third portion of the one or more payments to be allocated to the third entity. In some instances, each of the first, second, and third portions can include a specified amount, a proportion, and/or a percentage.

Moreover, many other variations or applications are possible. In some embodiments, one or more intermediate-level resources (e.g., published/offered middle-level resources) can be optional. For instance, low-level resources such as IaaS can be used directly to create high-level resources such as SaaS. In one example, a developer or creator can start with a low-level resource, add desired functionality to the low-level resource, and generate a high-level resource (e.g., application, service, etc.).

In some embodiments, the service catalog or self-service portal can operate or work with various entities and allow for consumption and/or (re-)publishing at multiple levels.

In some embodiments, the various entities can correspond to different corporate entities. In some embodiments, the various entities can correspond to different departments or portions of a single entity. In some embodiments, the various entities can correspond to a single entity.

In some embodiments, the service catalog or self-service portal can handle the money flow or licensing agreements between all parties in a single-party or multi-party chain of publishers.

Various other embodiments and/or applications are also possible. In one example scenario, the disclosed technology can allow for the creation of a marketplace or exchange for facilitating interactions among users (e.g., consumers, publishers, etc.) of computing resources or offerings.

It is further contemplated that there can be many other uses, applications, and/or variations associated with the various embodiments of the present disclosure.

Abstraction Layer—Example Implementation

Figure 7:
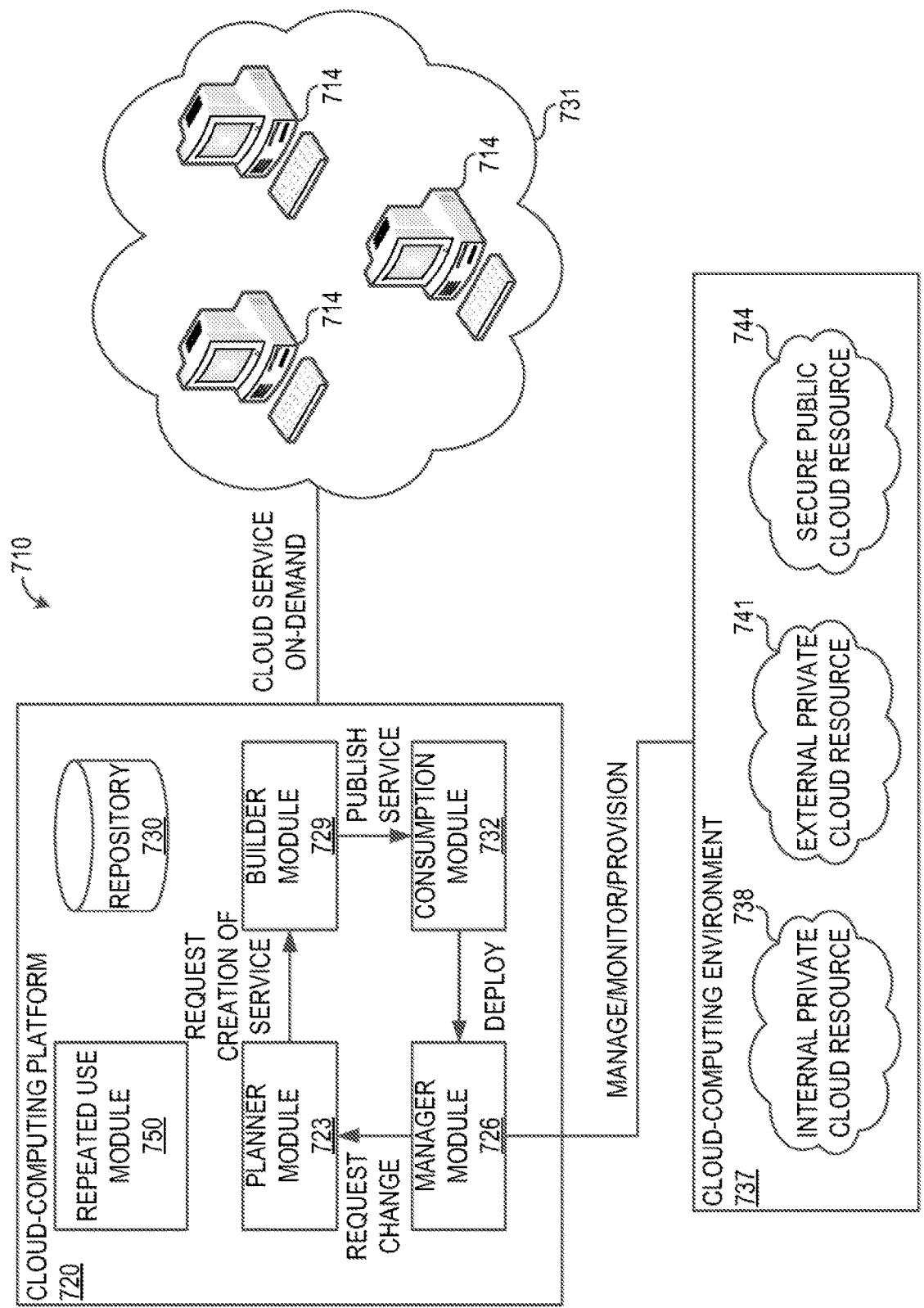
FIG. 7 shows a diagram illustrating an example system in accordance with an embodiment of the present disclosure.

FIG. 7 shows a diagram illustrating an example system 710 in accordance with an embodiment of the present disclosure. FIG. 7 illustrates a cloud-computing environment 735 comprising one or more cloud-computing resources, a client network 731 comprising client computing devices 714 (e.g., desktops, laptops, smart mobile devices), and a cloud-computing platform 720 (i.e., cloud management abstraction layer, hybrid cloud management platform) in accordance with an embodiment of the present disclosure. In FIG. 7, cloud-computing platform 720 provides a system through which computing devices 714 residing on client network 731 (e.g., enterprise network) can access one or more cloud-computing services. A cloud-computing service can comprise a cloud-computing resource residing within the cloud-computing environment 735 and managed by the cloud-computing platform 720 to provide the cloud computing service. Depending on the embodiment, cloud-computing environment 735 may comprise one or more cloud providing networks that include cloud-computing resources (e.g., cloud services provided by public or private clouds, which may be external or internal to the enterprise that uses them) that can be utilized by users. Additionally, depending on the embodiment, platform 720 may reside on the client network 731 or separate from the client network 731.

Cloud-computing environment 735 may comprise an internal cloud, an external cloud, a private cloud, or a public cloud (e.g., commercial cloud). In the example of FIG. 7, cloud-computing environment 735 comprises internal private cloud resource 738, external private cloud resource 741, and secure public cloud resource 744. A private cloud may be implemented using a variety of cloud systems including, for example, Eucalyptus Systems, VMWare vSphere®, or Microsoft® HyperV. Providers of public clouds may include, for example, Amazon EC2®, Amazon Web Services®, Terremark®, Savvis®, or GoGrid® Cloud-computing resources provided by these clouds may include, for example, storage resources (e.g., Storage Area Network (SAN), Network File System (NFS), and Amazon S3®), network resources (e.g., firewall, load-balancer, and proxy server), internal private resources, external private resources, secure public resources, infrastructure-as-a-services (IaaSs), platform-as-a-services (PaaSs), or software-as-a-services (SaaSs).

By using cloud-computing platform 720 to plan, build, manage, or use cloud-computing resources within a cloud-computing environment, users of platform 720 can be provided with standardized access to a variety of cloud-computing resources from disparate cloud-computing systems and providers without concerning themselves with the proprietary details of accessing or interfacing with such cloud-computing systems and providers. The platform 720 can be configured to take the workloads that are developed with the platform 720 and automatically provide the interfaces and access steps necessary to operate the workload on any particular platform or infrastructure element within a federation of cloud computing resources, such that the user is able to interact with the platform 720 to develop such workloads at a level of abstraction that allows the user to configure the logic of the workload (including conditional logic that allows interrelation of different workloads) and to embody the technical, operational, and business requirements of the workload in policies that are associated with the workload, without the user being required to access or understand the details of (or in some cases even know about the existence of) such particular platform or infrastructure elements. Additionally, users of platform 720 can access cloud-computing services through platform 720 on-demand and on a self-service basis through the standardized access. Users of cloud computing services offered by platform 720 may include end users, developers, partners, or administrators that reside on the client network 731.

Platform 720 may comprise planner module 723, manager module 726, builder module 729, and consumption module 732. Planner module 723 can be configured to plan cloud-computing service provided by platform 720 by inventorying, profiling, characterizing and prioritizing computer workloads, such as programs, applets, calculations, applications, servers, or services. For example, with respect to software/application development, planner module 723 may model current applications and associated software-development life cycle (SDLC) phases to determine what infrastructure environments would be required or preferred. This may include defining security, privacy, management or other profiles for each SDLC phase of each application. The profiles, in turn, will identify existing infrastructure and systems that support the SDLC phases, and manage relationships between the infrastructure, systems and the applications. Profiles may also contain characteristics regarding the SDLC phases or attributes relevant to development, deployment or performance of infrastructure, systems, or workloads, such as latency, geography, responsiveness, bandwidth, storage capacity, processing speed, processing type, platforms involved (including operating system, file types, communication protocols, and the like), data involved, protocols used, and specific institutional requirements. In terms of prioritizing the cloud-computing services needed for the SDLC phases, planner 723 may first identify which SDLC computing environments and systems would be suitable for cloud computing or migration to cloud computing, and then prioritize the enablement and operability of newly developed or migrated computer workloads according to the SDLC phases. Subsequently, the characterizations determined by planner module 723 can be used by builder module 729 to build a cloud-computing service or to deploy a computer workload to a cloud-computing resource. In the planner module 723 or in other components of the platform 720 associated with the planner module 23 the user may have access to, or may create or modify, policy information relevant to the computer workloads with which the user can interact in the planner module 723. The policy information may be stored in or associated with a meta model, which may enable the identification, characterization, and storage of a wide range of information, including policy information, that can be associated with a given workload. The metamodel data, including policy information, can be associated with the workload such that throughout the various components of the platform 720, from planning through deployment to a cloud, the workflow can be handled in a manner that is consistent with the metamodel data, and in particular consistent with the policies that are applicable to that workload. In the planner module 723 the planner/user may thus plan the use of workloads in a manner that is consistent with technical, operational, and business requirements that are appropriate with such workload, as seen by association of the same with the workload, and the planner/user may modify or populate the policies associated with the workload, such that the metamodel data for that workload embodies and is consistent with the plans of the planner/user. Once associated with the workload, such policies and other metamodel data are stored by the platform 720 and may be used throughout the development and deployment cycle.

Builder module 729 can be configured to assemble, validate, and publish a cloud-computing service or computer workload for consumption (i.e., use) by a user. Builder module 729 may be configured to receive characterization information from planner module 723 and build a cloud-computing service or computer workload based on the information. For example, builder module 729 may be configured to assemble a cloud computing service based on the prioritized list of computer workloads provided by planner module 723. Builder module 729 may be configured to create and edit scripts for loading computer workloads during installation, startup, runtime, and shutdown of cloud-computing services assembled by builder 729. The scripts for the cloud-computing services may be verified and validated before the cloud-computing services are published for consumption (i.e., use). The script may have access to metamodel and policy information which may alter how the script uses the metamodel and policy information to make a decision. Additionally, builder module 729 may be configured to associate the computer workload with the appropriate cloud-computing service or resource (e.g., associate an application with an appropriate underlying virtual machine image or associate a computer workload with a specific network). As with the planner module 723, in the builder module 729 the user/builder may have access to, or may create or modify, policy information relevant to the computer workloads with which the user can interact in the builder module 729, such as the policy information stored in or associated with the above-referenced meta model, which may enable the identification, characterization, and storage of a wide range of information, including policy information, that can be associated with a given workload. In the builder module 729 the builder/user may thus build of workloads in a manner that is consistent with technical, operational, and business requirements that are appropriate with such workload, as seen by association of the same with the workload, and the builder/user may modify or populate the policies associated with the workload, such that the metamodel data for that workload embodies and is consistent with the plans of the planner/user. In embodiments, the builder module 729 may present options to the builder pre-filtered, such as in pre-populated scripts, filtered drop-down menus, that are dictated by or consistent with the policies and other metamodel data associated with a workload, omitting, blocking or hiding options that are inconsistent with such policies. For example, a workload that stores customer data could omit the option to store a social security number if a data privacy regulation prohibits storing such data in the business process to which the workload relates. Such automatic pre-filtering, pre-configuration, and blocking ensure consistency with the policies associated with the workload at the planning stage (or other stages) while also improving efficiency by removing development paths that might be pursued despite being prohibited. In embodiments, the metamodel provides a flexible structure to organize metadata and apply the same policies using a combination of system and user supplied metadata that may indicate use of the same policy, however may define the same policy in different ways. For example, in some embodiments, the system may consider a Tier 5 datacenter to be the most fault tolerant type of data center and a user may consider a Tier 1 data center to be the most tolerant. The metamodel allows a policy that requires provisioning in the most fault tolerant data center to be assigned Tier 5 or Tier 1 metadata, depending on the definition of the most fault tolerant data center in that specific operating environment.

Eventually, builder module 729 can publish a cloud-computing service for consumption by users. In some embodiments, the builder module 729 can publish the cloud-computing service to a consumption module 732 (e.g., store or storefront such as an application store, a service store, or a software stack store) where users can preview, select, and subscribe to a cloud-computing service for use. Further, in some embodiments, the builder module 729 can enter the cloud-computing service in repository 730 when it is ready and available for consumption by users. Embodiments may also be configured for the builder module 729 such that the development community can approve or disapprove of the cloud-computing service before publication.

Consumption module 732 is configured to allow a user to subscribe to, collaborate on, and assess a cloud-computing service published for consumption. For example, a user can preview cloud-computing services available for deployment to the virtual private cloud and consumption. Then, when a user wants to subscribe and invoke a cloud-computing service for usage, the user can invoke the cloud-computing service on a self-service, on-demand basis through the consumption module 732. Consumption module 732 may list published available cloud-computing service at or near real-time, and allow a user to request updates and information on a listed cloud-computing service. In some embodiments, the consumption module 732 may allow users to collaborate on where, what, and how many cloud-computing services are deployed for consumption. In further embodiments, consumption module 732 may allow a user to comment on and rate cloud-computing services, or assess the cost associated with deploying and using a cloud-computing service. As noted above, as with the planning module 723 and the builder module 729, the consumption module 732 has access to policy information and other metamodel data that is associated with each workload, such that the workload may be consumed only in a manner that is consistent with such policy information. Thus consumption policies related to permitted time, permitted sets of users, security, pricing, resource consumption rules, and a wide variety of other policies may be maintained by the consumption module based on the policies associated with the workload in the platform 720.

Manager module 726 can be configured to provision one or more cloud-computing resources for a cloud-computing service or computer workload, manage one or more cloud-computing resources for the cloud-computing service or computer workload, and monitor one or more cloud-computing resources for the cloud-computing service or computer workload. For example, manager module 726 may provision one or more cloud-computing resources (e.g., provision one or more virtual machine instances) for a published cloud-computing service that is invoked from the consumption module 732. Upon invoking the cloud-computing service, the manager module 726 may deploy and start the one or more cloud-computing resources to the virtual private cloud for the cloud-computing service.

With respect to control, manager module 726 may control the start, stop, or run-time of one or more cloud-computing resources (e.g., control start, stop, or run-time of virtual machine instance) for a cloud-computing service. Manager module 726 may further schedule the start and stop time windows for the one or more cloud-computing resources, or govern a service level, such as per a service level agreement (SLA), or a threshold associated with the one or more cloud-computing resources. Through its control, manager module 726 can govern the cloud-computing resource according to conditions, constraints, security policies, or non-security policies. Manager module 726 may also monitor the one or more cloud-computing resources, detect security intrusions, and monitor the consumption of cloud-computing services their associated cloud-computing resources in order to determine the costs accrued by a user. Aspects of cloud-computing resources monitored by manager module 726 include, for example, central processing unit (CPU) usage, memory usage, data storage usage, data input/output usage, application usage, workload usage, service usage, and other attributes of usage of a service or a computer workload.

In some embodiments, manager module 726 is configured such that a user can request a planner using the planner module 723 to change the design of a cloud-computing service. For example, a user may request that the cloud-computing service change or computer workload with respect to the cloud-computing resources utilized (e.g., change to a platform stack). As in the other components of the platform 720, in the manager module 726 the user may have access to, or may create or modify, policy information or metamodel data relevant to the computer workloads with which the user can interact in the manager module 726. The manager/user of the manager module 726 may thus manage the provisioning of infrastructure and platform elements such that usage will be consistent with the policies of the enterprise, including operational and business policies, as well as technical requirements. For example, provisioning to expensive infrastructure elements may be confined to workloads that satisfy business rules that distinguish between mission critical elements and other elements. The manager/user of the manager module 726 may be provided with access to the policies consistent with the metamodel framework, and in embodiments may be provided with pre-filtered options, such as in menu choices, decision trees, or the like, that are consistent with such policies. For example, a workload designated as non-critical in its metamodel data could automatically appear in the manager module with deployment options confined to relatively low cost clouds, while a mission-critical workload might appear with all different cloud options (or ones that are filtered to satisfy certain requirements as to low latency, bandwidth, storage capacity, guaranteed quality of service, or the like). As with other modules, the manager module 726 may thus enforce policy while streamlining workflow, improving both effectiveness and efficiency.

In some embodiments, the cloud-computing platform can also comprise a repeated use module 750, as shown in FIG. 7. The repeated use module 750 can be configured to facilitate or provide for the repeated use (e.g., recursive consumption and/or publication) of computing resources or offerings. In some implementations, the repeated use module 750 can correspond to the repeated use module 102 of FIG. 1, the repeated use module 202 of FIG. 2, the repeated use module 302 of FIG. 3, and/or the repeated use module 400 of FIG. 4.

In some cases, the repeated use module 750 can be implemented as software, hardware, or any combination thereof. In some embodiments, the repeated use module 750 can be implemented in, integrated with, or can correspond to a service catalog or a self-service portal. In some embodiments, the repeated use module 750 can be implemented as or reside with (at least a portion of) the cloud computing platform 720. Moreover, in some embodiments, the repeated use module 750 can be implemented, in part or in whole, in one or more of the various modules included with the cloud computing platform 720. For example, the repeated use module 750 can be implemented, in part or in whole, in a scheduling module of the cloud computing platform 720 and/or in the manager module 726 of the cloud computing platform 720.

Figure 8:
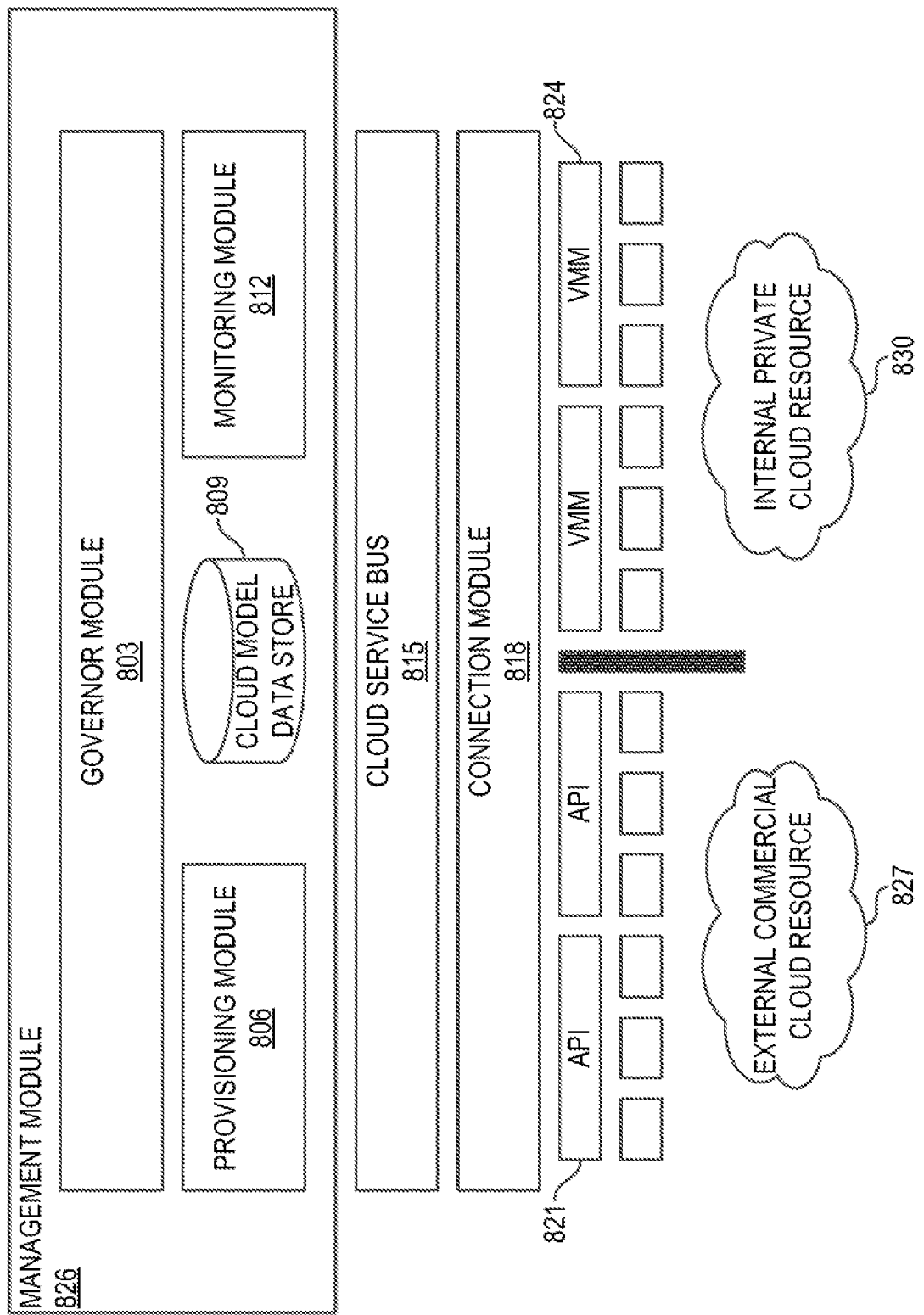
FIG. 8 shows a diagram illustrating an example management module in accordance with an embodiment of the present disclosure.

FIG. 8 shows a diagram illustrating an example management module 826 (e.g., management module 726 in FIG. 7) in further detail. As illustrated, management module 826 comprises governor module 803 configured to govern operation of a cloud-computing services and its associated cloud-computing resources, provisioning module 806 configured to provision cloud-computing resources for a cloud-computing service, and monitoring module 812 configured to facilitate the various monitoring functions of management module 826.

In embodiments, the present disclosure may provide for a policy-driven infrastructure as a service (IaaS) event bus, which can be comprised of a policy engine, metamodel, reporting system, and workflow engine; and allows for the creation of business policies, such that said business policies can be reflected into a dynamic information technology environment and expressed across internal and external information technology infrastructure, regardless of operating system, programming language, middle-ware solution, application platform, or cloud provider, by making use of abstraction layers. The workflow engine provides an integration point between the IaaS event bus and workflow management. The abstraction layers allow for integration with application programming interfaces made available by different vendors, business models, technical models, eventing and altering channels and monitoring systems in a vendor agnostic manner. In embodiments the abstraction layer could be a cloud-computing provider. A cloud computing provider may be VMWare, Baremetal, Amazon EC2, Savvis, TerreMark, Microsoft HyperV, and the like. In other embodiments, there may be multiple layers of abstraction in an abstraction layer.

The policy engine allows policies to be created through an easy to use visual interface that allows users that do not necessarily have information technology skills or other programming skills to author and assign policies to workloads. The policies can be expressed via languages such as XML, and the like. In some embodiments of the present disclosure a policy could be an event policy. An event policy supports matching one or more events that are temporally related and generate a notification action when matches occur. An event can be defined as either a threshold condition or matching constraints specified as rules. A rule can be comprised of one or more match constraints and each match constraint must be satisfied, by a logical "and" operation, within a specified sliding time window in order for the notification actions to be invoked. A match specifies the set of conditions that must be satisfied to match an event. Each condition specifies a property of an event or object contained by the event, which is matched against a set of one or more values using the supplied comparison operation If multiple values are supplied for a condition then the result is a logical "or" operation of the property being compared and against each value individually. Any of the event properties or properties of objects contained within the event structure may be used to refine the match criteria. For example, an auto-scaling policy may be created to add more web and database servers according to a ration if a business application becomes heavily loaded, in order to reduce the load on that application. In another example, an auto-scaling policy with business awareness may be created that deploys additional business topologies according to an algorithm if revenue per hour exceeds a threshold.

The metamodel allows the system to abstract business user definition from technical definition and allows an enterprise to track information about information technology resources that were unknown when the system was created. By abstracting the business user definition from the technical definition, the metamodel allows business users to define data classes consistent with their enterprise nomenclature, while still being able to map them consistently to the internal system. For example a Tier 4 data center is common technical classification of a data center that generally has the highest uptime, however some enterprises refer to Tier 4 data centers as Tier 1 and the metamodel would allow Tier 1 and Tier 4 to be used interchangeably, depending on the definition used by a specific enterprise. This provides a benefit to the enterprise by eliminating the need to write specific policies for each instance or the need to customize each abstraction layer for individual instances. By tracking information about IT resources that were unknown when the system was created, the metamodel allows business users to arbitrarily define elements of data to track and create policy after the system was built, also allowing the users to track a specific piece of information that is defined for any resources that are managed by the system. Resources could be networks, storage, servers, workloads, topologies, applications, business units, and the like.

In other further embodiments, the policy-driven infrastructure as a service may also include additional components. Additional components may be reporting, auditing, and federated identify management systems.

In embodiments, the present disclosure may provide for a visual policy editor, which provides an easy-to-use graphical user interface to a feature-rich and extensible policy engine, using a visual programming language and policies, eliminating the need for the user to write complex code to define, assign, and enforce policies. The graphical user interface allows the user to author policies using a visual drag-and-drop interface or an XML editor. The visual programming language functions could be loops, variables, branching, switching, pulling of attributes, code execution within a policy, and the like. For example the visual programming language could access an external pricing engine that contains live pricing information, then make a decision on the next step of the execution process, based on the information it receives from the pricing engine. In some embodiments, policies can be enforced at an object level. Objects could be organizational groups, individual projects, different deployment environments, and the like. Policies could be access control policies, firewall policies, event-based policies and the like. Access control policies could include packages, scripts, and the like. Access control policies could be defined by cloud or other service providers, network attributes, network geographic location, security policies, and the like. Firewall policies may include port and network ACL lists that are applied as policies and applied at container level to ensure conformance to corporate standards for port opening/closing. Event based policies relate to service level management and could include compound threshold rules that trigger an action, lifecycle event management, compound event sequences, signature detection, and policy stacking, and the like. For example, a policy could be defined to restrict deployment of a computing workload to private internal clouds in a specific country.

In embodiments, the present disclosure may provide for automated processes to support a continuous integration cycle to migrate a computing workload from a development environment to an operational environment. The continuous integration cycle may include maintaining a code repository, automating the build process, self-testing the build process, automatically deploying the build, and the like. The policies and metamodels defined and assigned to the computing workload environment follow the build from its creation using the Builder Module through to its publication into the Consumption module. This capability allows the enterprise to greatly reduce the time required to develop, test, deploy and update a computing workload. Continuous integration may also include ensuring the modernization, patch management, conforming configuration of deployed cloud-computing services. The embodiments may provide this service as DevToOps policy allowing centrally defined service definition that deployed cloud-compute services can compare against and either update themselves when their configuration no longer matches, warn administrators of non-conformance, rewrite themselves back to conformance when configurations of the cloud-compute services are made arbitrarily, and the like.

As noted before, various embodiments of the present disclosure provide standardized access, management, or control to different types of cloud-computing resources on a self-service, on-demand basis without the user needing to know the specific instructions or details for accessing, managing, or controlling those different target cloud-computing resources.

In some implementations, in order to translate a standard management action for a cloud-computing service to instructions for its cloud-computing resource and/or instructions for a computer workload to be executed on a cloud-computing resource, some management modules may comprise a cloud model data store 809 that maps the management action to the appropriate cloud-computing resources. Subsequently, the management action can be translated to one or more instructions for a target cloud-computing resource and/or a computer workload operating thereon. For example, a topology is an example of a cloud service, where a topology can be comprised of a number of individual virtual machines orchestrated together. A common management action to perform on a topology is to start it. This simple topology start action within the management layer gets turned into a number of individual instructions that get passed down into the cloud service bus 815, such as (1) calculate the Start Up order for topology, (2) initiate ordered startup one VM at a time, (3) as VM's come up, attach volumes that are associated with the VM, (4) install any packages and software onto the VM's, and (5) once all machines are up and running the topology status changes to running.

Cloud service bus 815 may be utilized to parse management instructions received from the manager module 826, transform the management instructions to instructions compatible with the target cloud-computing resource, and route the management instruction to the targeted cloud-computing resource. In some embodiments, the cloud service bus 815 can then route, via a connection module(s) 818, the instructions to the application program interface (API) 821 for a target cloud-computing resource from an external commercial cloud resource(s) 827, or to the virtual machine manager (VMM) (e.g., hypervisor) 824 for a target cloud-computing resource from an internal private cloud resource(s) 830.

Hardware Implementation

Figure 9:
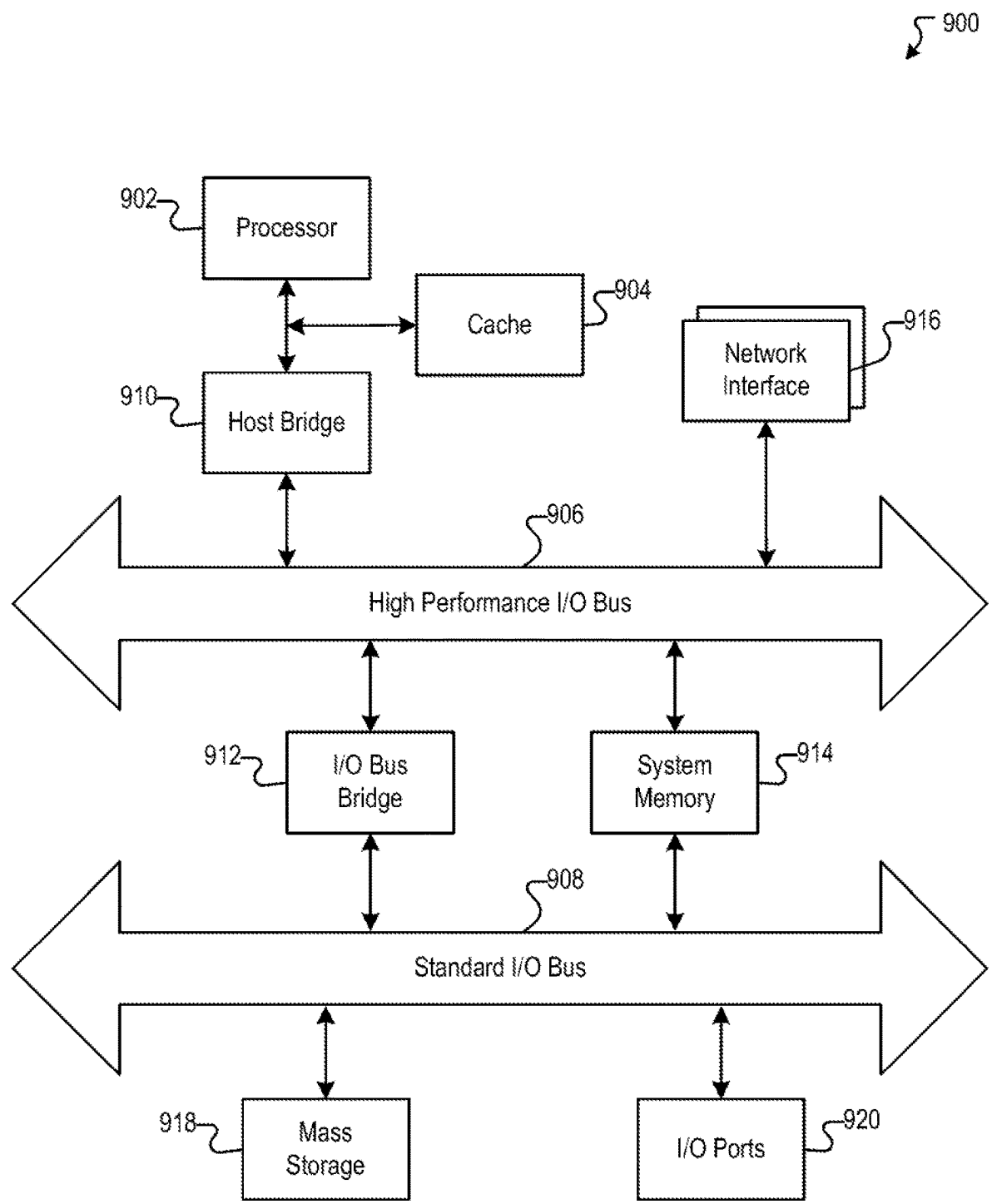
FIG. 9 illustrates an example of a computing device or system that can be used to implement one or more of the embodiments described herein, according to an embodiment of the present disclosure.

The foregoing processes and features can be implemented by a wide variety of machine and computer system architectures and in a wide variety of network and computing environments. FIG. 9 illustrates an example of a computer system 900 that may be used to implement one or more of the embodiments described herein in accordance with an embodiment of the invention. The computer system 900 includes sets of instructions for causing the computer system 900 to perform the processes and features discussed herein. The computer system 900 may be connected (e.g., networked) to other machines. In a networked deployment, the computer system 900 may operate in the capacity of a server machine or a client machine in a client-server network environment, or as a peer machine in a peer-to-peer (or distributed) network environment. In an embodiment of the invention, the computer system 900 may be a component of the networking system described herein. In an embodiment of the present disclosure, the computer system 900 may be one server among many that constitutes all or part of a networking system.

The computer system 900 can include a processor 902, a cache 904, and one or more executable modules and drivers, stored on a computer-readable medium, directed to the processes and features described herein. Additionally, the computer system 900 may include a high performance input/output (I/O) bus 906 or a standard I/O bus 908. A host bridge 910 couples processor 902 to high performance I/O bus 906, whereas I/O bus bridge 912 couples the two buses 906 and 908 to each other. A system memory 914 and one or more network interfaces 916 couple to high performance I/O bus 906. The computer system 900 may further include video memory and a display device coupled to the video memory (not shown). Mass storage 918 and I/O ports 920 couple to the standard I/O bus 908. The computer system 900 may optionally include a keyboard and pointing device, a display device, or other input/output devices (not shown) coupled to the standard I/O bus 908. Collectively, these elements are intended to represent a broad category of computer hardware systems, including but not limited to computer systems based on the x86-compatible processors manufactured by Intel Corporation of Santa Clara, California, and the x86-compatible processors manufactured by Advanced Micro Devices (AMD), Inc., of Sunnyvale, California, as well as any other suitable processor.

An operating system manages and controls the operation of the computer system 900, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 900 are described in greater detail below. In particular, the network interface 916 provides communication between the computer system 900 and any of a wide range of networks, such as an Ethernet (e.g., IEEE 802.3) network, a backplane, etc. The mass storage 918 provides permanent storage for the data and programming instructions to perform the above-described processes and features implemented by the respective computing systems identified above, whereas the system memory 914 (e.g., DRAM) provides temporary storage for the data and programming instructions when executed by the processor 902. The I/O ports 920 may be one or more serial and/or parallel communication ports that provide communication between additional peripheral devices, which may be coupled to the computer system 900.

The computer system 900 may include a variety of system architectures, and various components of the computer system 900 may be rearranged. For example, the cache 904 may be on-chip with processor 902. Alternatively, the cache 904 and the processor 902 may be packed together as a "processor module", with processor 902 being referred to as the "processor core". Furthermore, certain embodiments of the invention may neither require nor include all of the above components. For example, peripheral devices coupled to the standard I/O bus 908 may couple to the high performance I/O bus 906. In addition, in some embodiments, only a single bus may exist, with the components of the computer system 900 being coupled to the single bus. Furthermore, the computer system 900 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 900 that, when read and executed by one or more processors, cause the computer system 900 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 900, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 902. Initially, the series of instructions may be stored on a storage device, such as the mass storage 918. However, the series of instructions can be stored on any suitable computer readable storage medium. Furthermore, the series of instructions need not be stored locally, and could be received from a remote storage device, such as a server on a network, via the network interface 916. The instructions are copied from the storage device, such as the mass storage 918, into the system memory 914 and then accessed and executed by the processor 902. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 900 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

It should also be appreciated that the specification and drawings are to be regarded in an illustrative sense. It can be evident that various changes, alterations, and modifications can be made thereunto without departing from the broader spirit and scope of the disclosed technology.

Moreover, the language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed:

1. A computer-implemented method comprising:
providing, by a computing system, access to an Infrastructure-as-a-Service (IaaS) resource via an access portal, the IaaS resource being created by a first entity and associated with a first metric;
accessing, by the computing system, a Platform-as-a-Service (PaaS) resource, the PaaS resource generated by a second entity based, at least in part, on the IaaS resource;
providing, by the computing system, access to the PaaS resource via the access portal, the PaaS resource associated with a second metric;
accessing, by the computing system, a Software-as-a-Service (SaaS) resource, the SaaS resource generated by a third entity based, at least in part, on the PaaS resource;
providing, by the computing system, access to the SaaS resource via the access portal, the SaaS resource associated with a third metric;
tracking, by the computing system, relational information associated with the IaaS resource, the PaaS resource, and the SaaS resource, wherein:
tracking, by the computing system, the relational information associated with the IaaS resource, the PaaS resource, and the SaaS resource comprises tracking usage relational information, such that:
access of the SaaS resource by a fourth entity results in allocation of the first metric to the first entity, the second metric to the second entity, and the third metric to the third entity, and
access of the PaaS resource by the fourth entity results in allocation of the first metric to the first entity, and the second metric to the second entity;
allocating, by the computing system, a utilization from the second entity and the third entity, wherein the third metric includes the second metric, wherein the second metric includes the first metric, and wherein the allocation includes the first metric;
wherein the relational information associated with the IaaS resource, the PaaS resource, and the SaaS resource further comprises a condition; and
limiting, by the computing system, access to the IaaS resource, the PaaS resource, and the SaaS resource based on the condition.

2. The computer-implemented method of claim 1, wherein the relational information further includes at least one of service-level agreement (SLA) information, or configuration information.

3. The computer-implemented method of claim 1, further comprising:
providing, by the computing system, a marketplace configured to facilitate one or more interactions among users of the access portal.

4. The computer-implemented method of claim 1, wherein the computing system is associated with an abstraction layer of a cloud management system.

5. A system comprising:
at least one processor; and
a memory storing instructions that are executable by the at least one processor to cause the system to:
provide access to an Infrastructure-as-a-Service (IaaS) resource via an access portal, the IaaS resource being created by a first entity and associated with a first metric;
access a Platform-as-a-Service (PaaS) resource, the PaaS resource generated by a second entity based, at least in part, on the IaaS resource;
provide access to the PaaS resource via the access portal, the PaaS resource associated with a second metric;
access a Software-as-a-Service (SaaS) resource, the SaaS resource generated by a third entity based, at least in part, on the PaaS resource;
provide access to the SaaS resource via the access portal, the SaaS resource associated with a third metric;
track relational information associated with the IaaS resource, the PaaS resource, and the SaaS resource, wherein:
tracking the relational information associated with the IaaS resource, the PaaS resource, and the SaaS resource comprises tracking usage relational information, such that:
access of the SaaS resource by a fourth entity results in allocation of the first metric to the first entity, the second metric to the second entity, and
the third metric to the third entity, and
access of the PaaS resource by the fourth entity results in allocation of the first metric to the first entity, and the second metric to the second entity;
allocate a utilization from the second entity and the third entity, wherein the third metric includes the second metric, wherein the second metric includes the first metric, and wherein the allocation includes the first metric;
wherein the relational information associated with the IaaS resource, the PaaS resource, and the SaaS resource further comprises a condition; and
limit access to the IaaS resource, the PaaS resource, and the SaaS resource based on the condition.

6. A non-transitory computer-readable storage medium including instructions that are executable by at least one processor of a computing system to cause the computing system to:
provide access to an Infrastructure-as-a-Service (IaaS) resource via an access portal, the IaaS resource being created by a first entity and associated with a first metric;
access a Platform-as-a-Service (PaaS) resource, the PaaS resource generated by a second entity based, at least in part, on the IaaS resource;
provide access to the PaaS resource via the access portal, the PaaS resource associated with a second metric;
access a Software-as-a-Service (SaaS) resource, the SaaS resource generated by a third entity based, at least in part, on the PaaS resource;
provide access to the SaaS resource via the access portal, the SaaS resource associated with a third metric;
track relational information associated with the IaaS resource, the PaaS resource, and the SaaS resource, wherein:
track the relational information associated with the IaaS resource, the PaaS resource, and the SaaS resource comprises tracking usage relational information, such that:
access of the SaaS resource by a fourth entity results in allocation of the first metric to the first entity, the second metric to the second entity, and
the third metric to the third entity, and
access of the PaaS resource by the fourth entity results in allocation of the first metric to the first entity, and the second metric to the second entity;
allocate a utilization between the second entity and the third entity, wherein the third metric includes the second metric, wherein the second metric includes the first metric, and wherein the allocation includes the first metric;
wherein the relational information associated with the IaaS resource, the PaaS resource, and the SaaS resource further comprises a condition; and
limit access to the IaaS resource, the PaaS resource, and the SaaS resource based on the condition.

7. The system of claim 5, wherein the relational information further includes at least one of service-level agreement (SLA) information, or configuration information.

8. The system of claim 5, wherein the instructions are further executable to cause the systems to:
provide a marketplace configured to facilitate one or more interactions among users of the access portal.

9. The system of claim 5, wherein the system is associated with an abstraction layer of a cloud management system.

10. The medium of claim 6, wherein the relational information further includes at least one of service-level agreement (SLA) information, or configuration information.

11. The medium of claim 6, wherein the instructions are further executable to cause the computing system to:
provide a marketplace configured to facilitate one or more interactions among users of the access portal.

12. The medium of claim 6, wherein the computing system is associated with an abstraction layer of a cloud management system.

13. The system of claim 5, wherein the IaaS resource is associated with delivery of low-level operating system instances and resources.

14. The system of claim 5, wherein the PaaS resource is associated with delivery of a middle-ware environment and resources.

15. The system of claim 5, wherein the SaaS resource is associated with delivery of high-level, full-featured, ready-to-use applications.

16. The system of claim 5, wherein the first metric associated with the Iaas resource relates to a consumption cost of the IaaS resource.

17. The system of claim 5, wherein the condition relates to a licensing term.

18. The system of claim 5, wherein the condition relates to one or more of: a geographic restriction, a tiered pricing structure, a time duration, or an exclusion.

19. The system of claim 5, wherein the access portal is one of a service catalog or a self-service portal.

20. The system of claim 5, wherein the relational information indicates (i) a first portion of the allocation to be allocated to the first entity, (ii) a second portion of the allocation to be allocated to the second entity, and (iii) a third portion of the allocation to be allocated to the third entity, and wherein the first, second, and third portions specify at least one of a specified amount, proportion, or percentage to be allocated.

* * * * *